United States Patent
Prabhakar et al.

(10) Patent No.: US 11,937,140 B2
(45) Date of Patent: Mar. 19, 2024

(54) QUALITY OF SERVICE HANDLING PROCEDURES

(71) Applicant: Apple Inc., Cupertino, CA (US)

(72) Inventors: Alosious Pradeep Prabhakar, Singapore (SG); Mohammed Sadique, Parramatta (AU); Vijay Venkataraman, San Jose, CA (US); Krisztian Kiss, Hayward, CA (US); Han Pu, Hong Kong (HK); ChunLei Lin, Hong Kong (HK); Rodney G. Ibrahim, Oatlands (AU); Yip Pong Herbert Wong, Hong Kong (HK); Jordi Agud Ruiz, Meguro-ku (JP); Srinivasan Nimmala, San Jose, CA (US); Lakshmi N. Kavuri, Cupertino, CA (US); Utkarsh Kumar, Fremont, CA (US); Yifan Zhu, San Jose, CA (US); Kok Yin Chan, Hornsby (AU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/033,429

(22) Filed: Sep. 25, 2020

(65) Prior Publication Data

US 2021/0105687 A1 Apr. 8, 2021

Related U.S. Application Data

(60) Provisional application No. 62/909,284, filed on Oct. 2, 2019.

(51) Int. Cl.
*H04W 36/14* (2009.01)
*H04L 43/0829* (2022.01)
(Continued)

(52) U.S. Cl.
CPC ........ *H04W 36/14* (2013.01); *H04L 43/0829* (2013.01); *H04L 69/322* (2013.01);
(Continued)

(58) Field of Classification Search
None
See application file for complete search history.

(56) References Cited

U.S. PATENT DOCUMENTS

2010/0228975 A1 9/2010 Lipka et al.
2019/0082325 A1* 3/2019 Muhanna .............. H04W 12/08
(Continued)

FOREIGN PATENT DOCUMENTS

WO 2020166593 A1 8/2020

OTHER PUBLICATIONS

Partial European Search Report for EP 20199517.2-1218, dated Feb. 4, 2021, 18 pages.
(Continued)

*Primary Examiner* — Jeffrey M Rutkowski
*Assistant Examiner* — Mehedi S Aley
(74) *Attorney, Agent, or Firm* — Kowert, Hood, Munyon, Rankin & Goetzel, P.C.

(57) ABSTRACT

Embodiments are presented herein of apparatuses, processors, systems, and methods for performing Quality of Service handling procedures. A wireless device may establish a cellular link that provides access to a fifth generation core network. The wireless device may establish a protocol data unit session with a cellular network entity of the fifth generation core network. The wireless device may determine one or more Quality of Service flow descriptions for the protocol data unit session. The wireless device may perform one or more Quality of Service related modifications to the protocol data unit session.

20 Claims, 17 Drawing Sheets

(51) Int. Cl.
*H04L 69/322* (2022.01)
*H04W 12/033* (2021.01)
*H04W 36/00* (2009.01)
*H04W 36/26* (2009.01)
*H04W 76/16* (2018.01)
*H04W 76/18* (2018.01)
*H04W 76/19* (2018.01)
*H04W 76/27* (2018.01)

(52) U.S. Cl.
CPC ..... *H04W 12/033* (2021.01); *H04W 36/0069* (2018.08); *H04W 36/26* (2013.01); *H04W 76/16* (2018.02); *H04W 76/18* (2018.02); *H04W 76/19* (2018.02); *H04W 76/27* (2018.02)

(56) References Cited

U.S. PATENT DOCUMENTS

| | | | |
|---|---|---|---|
| 2019/0215693 A1 | 7/2019 | Lee et al. | |
| 2020/0053819 A1* | 2/2020 | Huang-Fu | H04W 76/11 |
| 2020/0137643 A1 | 4/2020 | Li et al. | |
| 2020/0154307 A1* | 5/2020 | Huang-Fu | H04W 28/04 |
| 2020/0162958 A1* | 5/2020 | Huang-Fu | H04W 56/001 |
| 2020/0275259 A1* | 8/2020 | Zhu | H04W 76/16 |
| 2020/0304985 A1* | 9/2020 | Gupta | H04W 4/70 |
| 2020/0322834 A1* | 10/2020 | Huang-Fu | H04W 28/0268 |
| 2020/0404609 A1* | 12/2020 | Huang-Fu | H04W 76/15 |
| 2021/0029628 A1* | 1/2021 | Kim | H04W 76/19 |
| 2021/0185598 A1* | 6/2021 | Kim | H04W 48/16 |
| 2021/0235266 A1* | 7/2021 | Starsinic | H04W 8/205 |
| 2021/0250801 A1* | 8/2021 | Van Der Velde | H04W 76/22 |
| 2021/0289569 A1* | 9/2021 | Park | H04W 68/005 |
| 2021/0307101 A1* | 9/2021 | Kim | H04W 48/02 |

OTHER PUBLICATIONS

"3rd Generation Partnership Project; Technical Specification Group services and System Aspects; Technical report on key issues and potential solutions for Integrity protection of the User Plane Release 16" 3GPP TR 33.853 V0.5.0. Valbonne, France, Aug. 2019, 25 pages.

Extended European Search Report for EP Patent Application No. 23206088.9; dated Jan. 5, 2024.

Samsung "PDU session modification for multiple access", 3GPP TSG-CT WG1 Meeting #120 C1-196504; Oct. 7, 2019.

* cited by examiner

```
-- ASN1START
-- TAG-PDCP-CONFIG-START
PDCP-Config ::=     SEQUENCE {
    drd                 SEQUENCE {
        discardTimer        ENUMERATED {ms10, ms20, ms30, ms40, ms50, ms60, ms75, ms100, ms150, ms200
                                ms250, ms300, ms500, ms750, ms1500, infinity}           OPTIONAL,    -- Cond Setup
        pdcp-SN-SizeUL      ENUMERATED {len12bits, len18bits}                            OPTIONAL,    -- Cond Setup2
        pdcp-SN-SizeDL      ENUMERATED {len12bits, len18bits}                            OPTIONAL,    -- Cond Setup2
        headerCompression   CHOICE {
            notUsed             NULL,
            rohc                SEQUENCE {
                maxCID              INTEGER (1..16383)                                   DEFAULT 15,
                profiles            SEQUENCE {
                    profile0x0001       BOOLEAN,
                    profile0x0002       BOOLEAN,
                    profile0x0003       BOOLEAN,
                    profile0x0004       BOOLEAN,
                    profile0x0006       BOOLEAN,
                    profile0x0101       BOOLEAN,
                    profile0x0102       BOOLEAN,
                    profile0x0103       BOOLEAN,
                    profile0x0104       BOOLEAN
                },
                drd-ContinueROHC    ENUMERATED { true }                                  OPTIONAL     -- Need N
            },
            uplinkOnlyROHC      SEQUENCE {
                maxCID              INTEGER (1..16383)                                   DEFAULT 15,
                profiles            SEQUENCE {
                    profile0x0006       BOOLEAN
                },
                drd-ContinueROHC    ENUMERATED { true }                                  OPTIONAL     -- Need N
            },
            ...
        },
        integrityProtection     ENUMERATED { enabled }                                   OPTIONAL,    -- Cond ConnectedTo5GC1
        statusReportRequired    ENUMERATED { true }                                      OPTIONAL,    -- Cond R1c-AM
        outOfOrderDelivery      ENUMERATED { true }                                      OPTIONAL,    -- Need R
                                                                                         OPTIONAL,    -- Cond DRM
}
```

From FIG. 10A

```
    moreThanOneRLC        SEQUENCE {
        primarypath       SEQUENCE {
            cellGroup         CellGroupId
            logicalChannel    LogicalChannelIdentity
        },
        ul-DataSplitThreshold  UL-DataSplitThreshold        OPTIONAL,    -- Cond SplitBearer
        pdcp-Duplication       BOOLEAN                      OPTIONAL,    -- Need R
    }                                                       OPTIONAL,    -- Cond MoreThanoneRLC
    t-Reordering          ENUMERATED {
                          ms0, ms1, ms2, ms4, ms5, ms8, ms10, ms15, ms20, ms30, ms40
                          ms50, ms60, ms80, ms100, ms120, ms140, ms160, ms180, ms200, ms2220,
                          ms240, ms260, ms280, ms300, ms500, ms750, ms1000, ms1250,
                          ms1500, ms1750, ms2000, ms2250, ms2500, ms2750,
                          ms3000, spare28, spare27, spare26, spare25, spare14,
                          spare23, spare22, spare21, spare20,
                          spare19, spare18, spare17, spare16, spare15,
                          spare13, spare12, spare11, spare10, spare09,
                          spare08, spare07, spare06, spare05, spare04, spare03,
                          spare02, spare01 }                 OPTIONAL,   -- Need S
    ...,
    [[
    cipheringDisabled              ENUMERATED {true}                     OPTIONAL    -- Cond ConnectedTo5GC
    ]]
    [[
1002─integrityProtectionDisabledForIRAT-r16   ENUMERATED {true}          OPTIONAL    -- Cond ConnectedTo5GC
    ]]
}
```

FIG. 10B

| IEI | Information Element | Type/Reference | Presence | Format | Length |
|---|---|---|---|---|---|
|  | Extended protocol discriminator | Extended protocol discriminator 9.2 | M | V | 1 |
|  | PDU session ID | PDU session identity 9.4 | M | V | 1 |
|  | PTI | Procedure transaction identity 9.6 | M | V | 1 |
|  | PDU SESSION MODIFICATION REQUEST message identity | Message type 9.7 | M | V | 1 |
| 28 | 5GSM capability | 5GSM capability 9.11.4.1 | O | TLV | 3-15 |
| 59 | 5GSM cause | 5GSM cause 9.11.4.1 | O | TV | 2 |
| 55 | Maximum number of supported packet filters | Maximum number of supported packet filters 9.11.4.9 | O | TV | 3 |
| B- | Always-on PDU session requested | Always-on PDU session requested 9.11.4.4 | O | TV | 1 |
| 13 | Integrity protection maximum data rate | Integrity protection maximum data rate 9.11.4.7 | O | TV | 3 |
| XX | Integrity protection enablement assistance | Integrity protection enablement assistance 9.11.4.xx | O | TV | 1 |
| 7A | Requested QoS rules | QoS rules 9.11.4.13 | O | TLV-E | 7-65538 |
| 79 | Requested QoS flow descriptions | QoS flow descriptions 9.11.4.12 | O | TLV-E | 7-65538 |
| 75 | Mapped EPS bearer contexts | Mapped EPS bearer contexts 9.11.4.8 | O | TLV-E | 7-65538 |
| 7B | Extended protocol configurations | Extended protocol configurations 9.11.4.6 | O | TLV-E | 7-65538 |

FIG. 12

QUALITY OF SERVICE HANDLING PROCEDURES

PRIORITY INFORMATION

This application claims priority to U.S. provisional patent application Ser. No. 62/909,284, entitled "User Plane Integrity Protection and Quality of Service Handling Procedures," filed Oct. 2, 2019, which is hereby incorporated by reference in its entirety as though fully and completely set forth herein.

FIELD

The present application relates to wireless devices, and more particularly to apparatus, systems, and methods for performing quality of service handling procedures in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods for handling quality of service in a wireless communication system.

According to the techniques described herein, it may be possible to support quality of service flow description modifications for a packet data session. Such modifications may be triggered by the wireless device or by a network element such as a session management function, possibly in response to potential wireless device mobility to a cell that operates according to a radio access technology that does not support a current quality of service flow description of the packet data session. Additionally or alternatively, if a wireless device performs inter radio access technology mobility, the wireless device may perform a mapping of the quality of service parameters of the packet data session from the original radio access technology to the new radio access technology, and may request the corresponding mapped quality of service parameters when establishing a new packet data session using the new radio access technology.

The techniques described herein may be implemented in and/or used with a number of different types of devices, including but not limited to base stations, access points, cellular phones, tablet computers, accessory and/or wearable computing devices, portable media players, unmanned aerial vehicles, unmanned aerial controllers, automobiles and/or motorized vehicles, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 10A-10B illustrate a possible IE that could be used in a NR RRC message to indicate that UP IP is disabled for the purposes of iRAT mobility, according to some embodiments;

FIG. 12 is a table illustrating where an Integrity protection enablement assistance information element description could be included in 3GPP specification documents, according to some embodiments;

Figure 1:
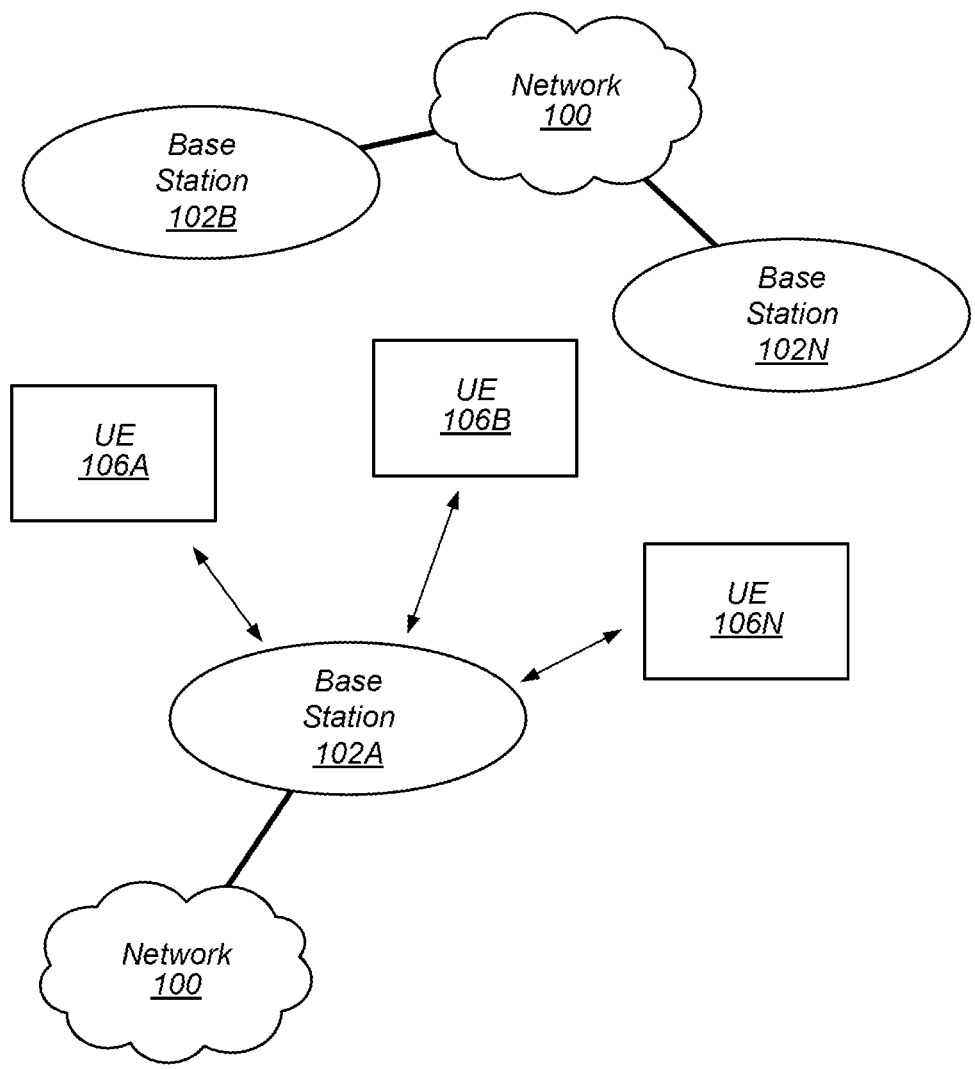
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
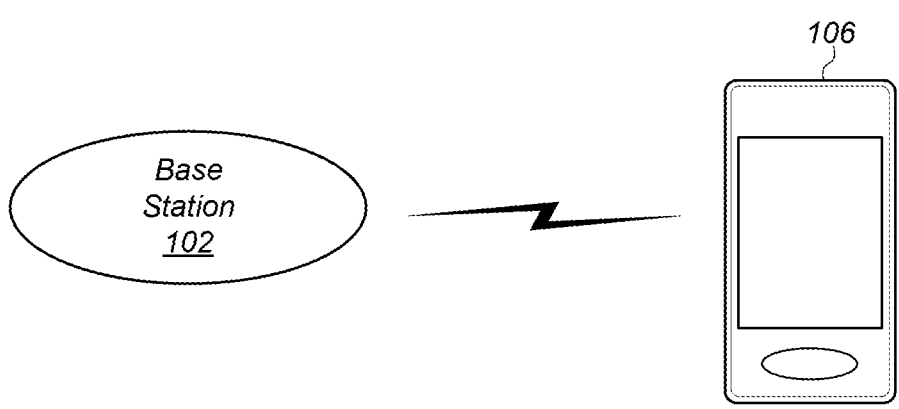
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1xRTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, an unmanned aerial vehicle (UAV), an unmanned aerial controller (UAC), an automobile, or virtually any type of wireless device.

The UE 106 may include a processor (processing element) that is configured to execute program instructions stored in memory. The UE 106 may perform any of the method embodiments described herein by executing such stored instructions. For example, a baseband processor of the UE 106 may be configured to perform any of the various operations described herein. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1xRTT, or either of LTE or GSM, among various possibilities), and separate radios for communicating using each of Wi-Fi and Bluetooth. Other configurations are also possible.

Figure 3:
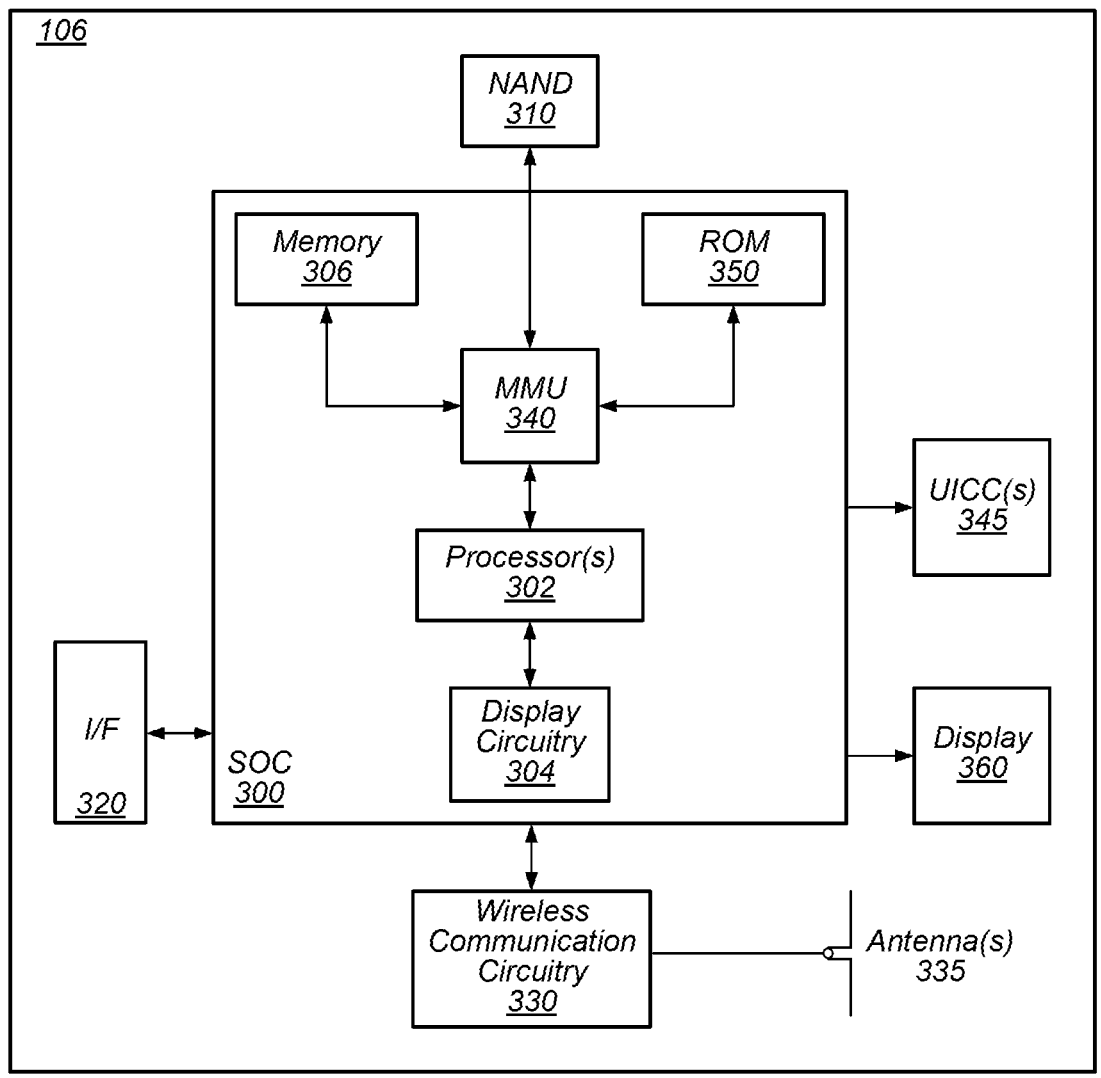
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
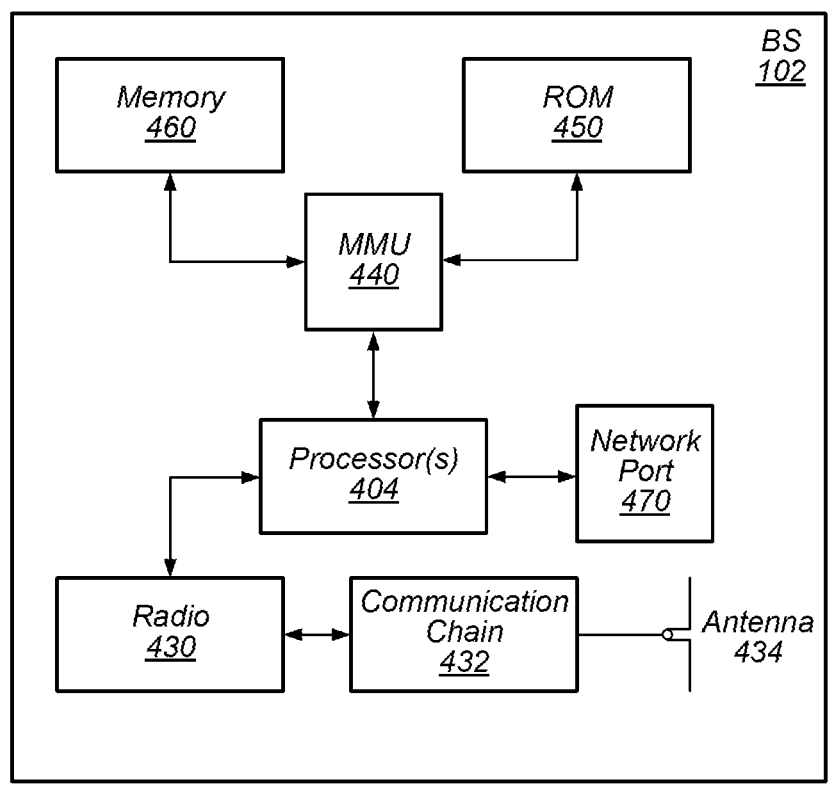
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
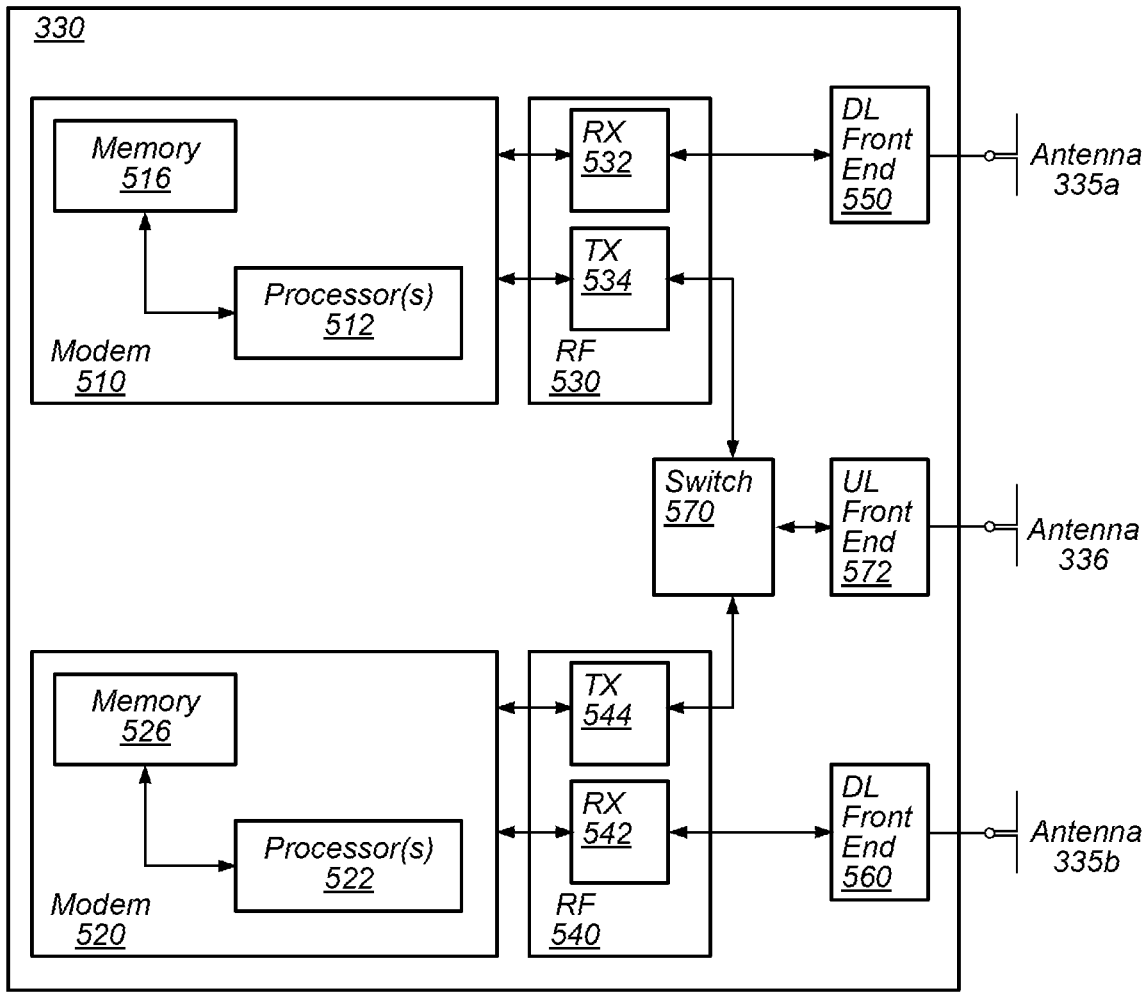
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some embodiments, the cellular communication circuitry 330 may also not include the switch 570, and the RF front end 530 or the RF front end 540 may be in communication, e.g., directly, with the UL front end 572.

Figure 6:
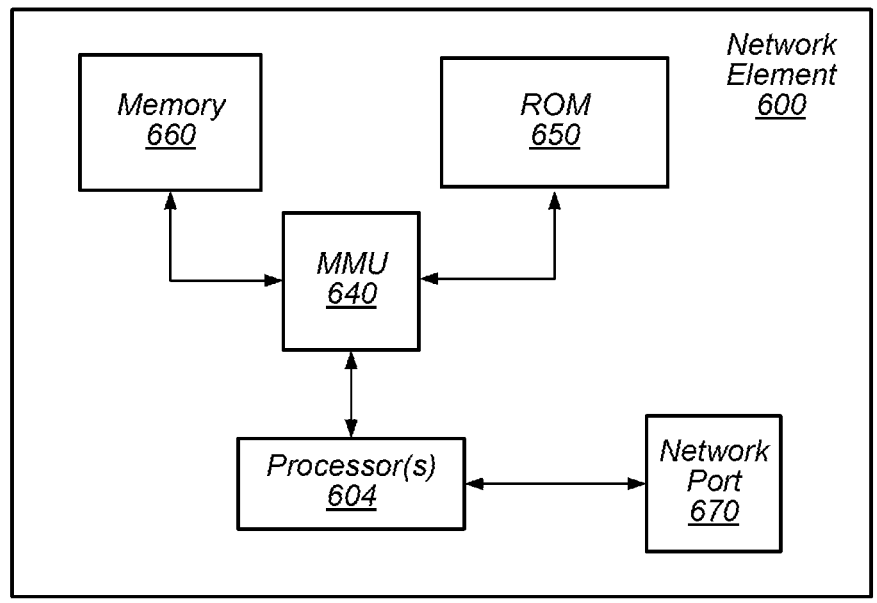
FIG. 6 illustrates an example block diagram of a network element, according to some embodiments.

FIG. 6—Exemplary Block Diagram of a Network Element

FIG. 6 illustrates an exemplary block diagram of a network element 600, according to some embodiments. According to some embodiments, the network element 600 may implement one or more logical functions/entities of a cellular core network, such as a mobility management entity (MME), serving gateway (S-GW), access and management function (AMF), session management function (SMF), etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementaiton of part or all of the methods described herein, e.g., by executing program instructions stored on a memory medium (e.g., a non-transitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Figure 7:
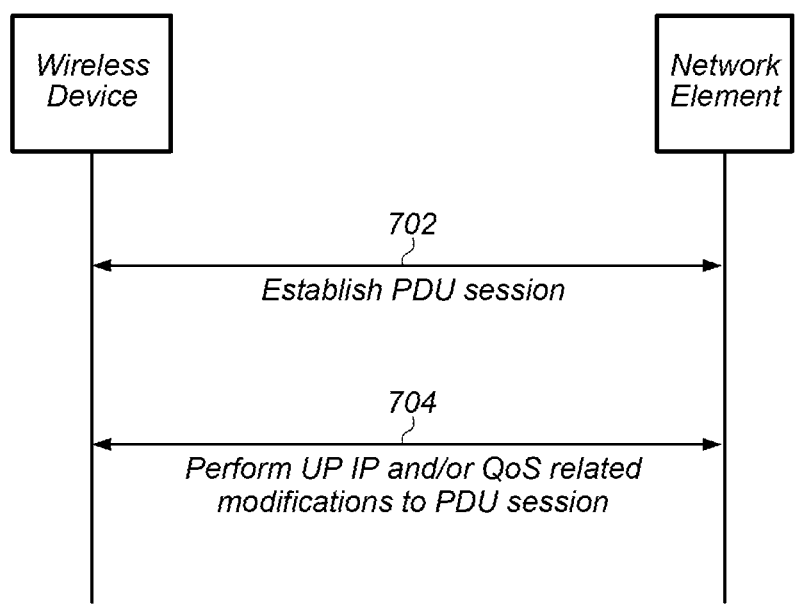
FIG. 7 is a flowchart diagram illustrating an example method for handling user plane integrity protection (UP IP) and quality of service in a wireless communication system; according to some embodiments.

FIG. 7—User Plane Integrity Protection and Quality of Service Handling Procedures New cellular communication techniques are continually under development, to increase coverage, to better serve the range of demands and use cases, and for a variety of other reasons. As new cellular communication technologies is developed and deployed, certain features may be included that are new or differ from previously developed and deployed cellular communication technologies. For example, user plane integrity protection may be a feature that can be enabled in conjunction with 5G NR cellular communication but may not be supported in conjunction with LTE cellular communication. As another example, Quality of Service parameters may differ between 5G NR cellular communication and LTE cellular communication.

Many cellular network operators may deploy multiple cellular communication technologies together, potentially including different generations of cellular communication technologies, such as LTE and NR. As a result, it may be possible that a wireless device could establish dual connectivity with cells that operate according to different cellular communication technologies, and/or could perform inter radio access technology (iRAT) mobility between cells that operate according to different cellular communication technologies. In view of such possible coexistence between multiple generations of cellular communication technologies, it may be useful to provide flexibility with respect to cellular communication features and parameters that may differ (e.g., in supported range, availability, etc.) between different cellular communication technologies, and possibly more generally.

Accordingly, FIG. 7 is a signal flow diagram illustrating an example of a method for handling user plane integrity protection and quality of service in a wireless communication system, at least according to some embodiments. Aspects of the method of FIG. 7 may be implemented by a wireless device such as a UE 106 illustrated in various of the Figures herein, a base station such as a BS 102 illustrated in various of the Figures herein, a network element such as an AMF or SMF, and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

In various embodiments, some of the elements of the methods shown may be performed concurrently, in a different order than shown, may be substituted for by other method elements, or may be omitted. Additional elements may also be performed as desired. As shown, the method of FIG. 7 may operate as follows.

In 702, a wireless device and a cellular network element may establish a protocol data unit (PDU) session, which may also be referred to herein as a packet data session, at least in some instances. In some instances, a signaling exchange may be performed between the wireless device and the network element in order to establish the PDU session, e.g., by way of a radio access network (RAN) and possibly one or more other cellular network elements, such as a session management function (SMF). For example, the wireless device may provide a PDU session establishment request message to the cellular network element, which may receive the PDU session establishment request message and provide a PDU session establishment accept message to the wireless device in response. At least in some instances, the PDU session may be established with a fifth generation core (5GC) network entity, for example by way of a cellular link that provides access to the 5GC network.

In some instances, the PDU session establishment accept message may include an indication of whether user plane integrity protection may be enabled for the PDU session. The wireless device may determine whether it is a possibility for user plane integrity protection to be enabled for the PDU session based on the indication of whether user plane integrity protection may be enabled for the PDU session, in some embodiments. Alternatively, or in addition, the wireless device may determine whether it is a possibility for user plane integrity protection to be enabled for the PDU session based on one or more other considerations. For example, if such information is not indicated during PDU session establishment, the wireless device may autonomously determine that it is a possibility for user plane integrity protection to be enabled for a PDU session when the wireless device receives a radio resource control (RRC) message indicating that user plane integrity protection is enabled for a data radio bearer that is associated with the PDU session.

In 704, the wireless device and/or the cellular network element may perform one or more user plane (UP) integrity protection (IP) and/or Quality of Service (QoS) related modifications to the PDU session. In some instances, the UP IP and/or QoS related modifications may be performed based at least in part on potential inter radio access technology (iRAT) mobility of the wireless device. For example, in some instances, if the wireless device is connected to a 5GC network via fifth generation service (5GS), but determines that mobility to an evolved packet core (EPC) network via evolved packet service (EPS) is possible (e.g., due to 5GS signal strength deteriorating and/or EPS service signal strength becoming better than 5GS signal strength in accordance with one or more configured measurement thresholds), it may be beneficial to modify one or more UP IP and/or QoS related characteristics of the PDU session that would not be supported by the EPC network. As another possibility, the UP IP and/or QoS related modifications may be performed for similar reasons based at least in part on the possibility of dual connectivity that may include use of a cellular link that provides access to an EPC network, e.g., even when the link with the 5GC network is expected to be retained.

For example, as one possibility, the cellular network entity may determine that the PDU session user plane security policy is "preferred", and may also determine that the PDU session may flow at least in part between the wireless device and a LTE eNB. For example, the cellular network entity may receive an indication (e.g., from an AMF of the 5GC network) that the wireless device may establish a secondary cellular link using LTE radio access that provides access to a 5G network as part of a Dual Connectivity configuration. The cellular network entity may determine to change the PDU session user plane security policy to "not needed" based at least in part on determining that the PDU session may flow at least in part between the wireless device and a LTE eNB. Additionally or alternatively, the cellular network entity may disable user plane integrity protection for the PDU session, e.g., if it is enabled. In such a scenario, the cellular network element may provide an indication to the wireless device to disable user plane integrity protection for the PDU session, e.g., for the purpose of establishing a cellular link that provides access to an EPC network.

In some instances, the UP IP and/or QoS related modifications may be performed based at least in part in response to a request from the wireless device. For example, it may be the case that the cellular network entity could receive a PDU session modification request message from the wireless device, which may include a mapped EPS bearer contexts information element to request one or more modifications to the QoS of one or more mapped EPS bearer contexts of the PDU session. The cellular network entity may determine to accept the requested modification to the QoS of one or more mapped EPS bearer contexts of the PDU session, in which case the cellular network entity may provide a PDU session modification accept message to the wireless device. Alternatively, the cellular network entity may determine to reject the requested modification to the QoS of one or more mapped EPS bearer contexts of the PDU session, in which case the cellular network entity may provide a PDU session modification reject message to the wireless device. The PDU session modification reject message could, for example, include a cause code for invalid mapped EPS bearer QoS, if the requested QoS modification is not recognized or identified by the cellular network.

In some instances, the cellular network entity could determine to release the PDU session in order to cause the wireless device to fallback to EPS. For example, the cellular network element could receive a service request from the wireless device, where the service request is for a service that is not supported by the 5GC network. In such a case, the cellular network element may provide a PDU session release message to release the PDU session with the wireless device based at least in part on the service request being for a service that is not supported by the 5GC network. The PDU session release message may include a cause code indicating to fallback to EPS, in such a scenario. Additionally, according to some embodiments, the PDU session release message may further include a mapped EPS bearer contexts information element indicating EPS bearer mapping information for the PDU session with the wireless device, for example to help support the fallback to EPS.

According to some embodiments, it may be possible for the wireless device to provide assistance information associated with the PDU session to the cellular network element. For example, the assistance information could be included with the PDU session establishment request message, or with a PDU session modification request message, among various possibilities. The assistance information may indicate whether the wireless device requests user plane integrity protection or does not request user plane integrity protection for the PDU session.

In scenarios in which the wireless device has triggered 5GS to EPS iRAT mobility, in addition (or alternatively) to possibly attempting to modify the UP IP and/or QoS characteristics of the PDU session to facilitate handover of the PDU session to EPS, the wireless device may determine how to perform the 5GS to EPS iRAT mobility for the PDU session based at least in part on the UP IP and/or QoS characteristics of the PDU session.

For example, for a PDU session for which UP IP is enabled and for which iRAT mobility from a 5G NR cellular link to a LTE cellular link is triggered, the wireless device may provide a PDU session modification request to the cellular network element (e.g., based at least in part on determining that UP IP is enabled for the PDU session and determining that inter-RAT mobility from the 5G NR cellular link to a LTE cellular link is triggered), which may request to modify the PDU session from UP IP enabled to UP IP disabled. If the cellular network element provides a PDU session modification command message that indicates to modify the PDU session from UP IP enabled to UP IP disabled in response to the PDU session modification request, the wireless device may perform PDU session handover when performing inter-RAT mobility from the 5G NR cellular link to a LTE cellular link (e.g., based at least in part on the PDU session modification command message indicating to modify the PDU session from UP IP enabled to UP IP disabled). If, however, the cellular network element provides a PDU session modification reject message in response to the PDU session modification request, the wireless device may re-establish the PDU session via the LTE link when performing the iRAT mobility from the 5G NR cellular link to the LTE cellular link (e.g., based at least in part on the PDU session modification reject message).

As another example, for a PDU session for which iRAT mobility from a 5G NR cellular link to a LTE cellular link is triggered and one or more QoS flow descriptions of the PDU session are not supported by the LTE cellular link, the wireless device may provide a PDU session modification request to the cellular network element (e.g., based at least in part on determining that iRAT mobility from the 5G NR cellular link to a LTE cellular link is triggered and determining that one or more QoS flow descriptions of the PDU session are not supported by the LTE cellular link), which may request to modify the QoS flow descriptions of the PDU session in such a manner as would be supported by the LTE cellular link. If the cellular network element provides a PDU session modification command message that indicates to modify the QoS flow descriptions of the PDU session as requested in response to the PDU session modification request, the wireless device may perform PDU session handover when performing inter-RAT mobility from the 5G NR cellular link to a LTE cellular link (e.g., based at least in part on the PDU session modification command message indicating to modify the QoS flow descriptions of the PDU session as requested). If, however, the cellular network element provides a PDU session modification reject message in response to the PDU session modification request, the wireless device may re-establish the PDU session via the LTE link when performing the iRAT mobility from the 5G NR cellular link to the LTE cellular link (e.g., based at least in part on the PDU session modification reject message).

In some instances, the wireless device may determine 5GS to EPS QoS parameter mappings for one or more QoS flows of the PDU session, e.g., to facilitate a 5GS to EPS iRAT transition when network support for iRAT PDU session handover is limited, such as when a N26 interface is unavailable. In such a scenario, the wireless device may store such 5GS to EPS QoS parameter mappings based at least in part on determining that inter-RAT mobility from the 5G NR cellular link to a LTE cellular link is triggered. The wireless device may further provide a bearer resource allocation request including the 5GS to EPS QoS parameter mappings for the QoS Flows of the PDU session when performing the inter-RAT mobility from the 5G NR cellular link to the LTE cellular link. This may help the wireless device to obtain appropriate PDU session QoS parameters for a PDU session when requesting default or dedicated bearer resource allocation for the PDU session, at least according to some embodiments.

Thus, the method of FIG. 7 may be used to perform modifications to the UP IP and/or QoS characteristics of a PDU session, at least according to some embodiments. As described herein, such modifications may be particularly helpful in at least some scenarios in which 5G NR and LTE cellular network interworking may occur, among other possible scenarios.

FIGS. 8-18 and Additional Information

FIGS. 8-18 illustrate further aspects that might be used in conjunction with the method of FIG. 7 if desired. It should be noted, however, that the exemplary details illustrated in and described with respect to FIGS. 8-18 are not intended to be limiting to the disclosure as a whole: numerous variations and alternatives to the details provided herein below are possible and should be considered within the scope of the disclosure.

In 3GPP 5G NR cellular communication, PDU session signaling may include exchange of a PDU session establishment request message and a PDU session establishment accept message between a UE and a SMF. It may be the case that inclusion of UP IP parameters by the UE may be mandatory, but that there is no requirement for the SMF to provide an information element (IE) informing the UE whether UP IP is enabled for the PDU session. However, if UP IP is enabled for a particular PDU session, it may be the case that 3GPP specification documents do not permit the PDU session to be handed over from 5GS to EPS. Accordingly, there may exist the possibility that a UE performing handover to EPS does not know whether a particular PDU session (e.g., an Internet PDU session, an IMS PDU session, etc.) should initiate handover or not. Additionally, if an N26 interface is not present, the UE may not have mapped EPS bearer contexts information from the SMF to facilitate PDU session handover or re-initiation.

To reduce the likelihood of such a scenario, as one possibility, it may be possible to introduce an IE that can be included in the PDU session establishment accept message that indicates whether the SMF may be enabling UP IP during the lifetime of the PDU session. The actual enablement (and disablement) of UP IP may still be controlled by the radio access network (RAN) at a per data radio bearer (DRB) level, at least in some instances. If such an approach is taken, the UE may be able to determine whether there is the possibility that the SMF may enable UP IP for a PDU session, such that for PDU sessions for which it is a possibility that UP IP may be enabled, the UE may proactively not initiate handover of these PDU sessions when transitioning from 5G NR (5GS) to LTE (EPS). This may in turn help avoid scenarios in which initiating a PDU session handover for a PDU session with UP IP enabled leads to a PDU session handover rejection from the network, and potentially a glitch in user experience when transitioning from 5G NR to LTE. Instead, in such an approach, when the UE moves to LTE, its packet data network (PDN) connection may be established as an initial PDN establishment (e.g., rather than as a handover).

As another possibility to reduce the likelihood of a scenario in which initiating a PDU session handover for a PDU session with UP IP enabled leads to a PDU session handover rejection from the network, a UE could be configured to autonomously detect whether UP IP is enabled for a PDU session, e.g., on a per PDU session basis. Such autonomous detection could be based at least in part on the RAN activation of UP IP for a DRB as part of a RRC-Reconfig message while the UE is in a RRC connected state. For example, an RRC-Reconfig message may include a PDCP-Config IE (such as may be described in 3GPP TS 38.311 v.15.7.0 section 6.3.2, at least according to some embodiments), in which UP IP may be enabled for a DRB. The UE could map the DRB for which UP IP is being enabled to the non access stratum (NAS) PDU session (e.g., Internet PDU session or IMS PDU session, etc.) associated with the DRB. Once the UE has determined that at least one DRB associated with a particular PDU session has had UP IP enabled at least once during the lifetime of the PDU session, the UE may designate this PDU as not eligible to be handed over to EPS.

The implementation of the UP IP may be performed in accordance with 3GPP technical specfications, at least according to some embodiments. For example, aspects of UP IP operation that may be used in conjunction with various aspects of this disclosure may be described in 3GPP TS 36.323 v.15.4.0, TS 38.323 v.15.6.0, and/or TS 33.501 v.15.6.0, according to some embodiments. At least according to some embodiments, according to 3GPP 5G NR specifications, the integrity protection function may include both integrity protection and integrity verification and may be performed in PDCP, if configured. The data unit that is integrity protected may include the PDU header and the data part of the PDU before ciphering. The integrity protection may always be applied to PDCP Data PDUs of SRBs. The integrity protection may be applied to PDCP Data PDUs of DRBs for which integrity protection is configured. The integrity protection may not be applicable to PDCP control PDUs.

For downlink and uplink integrity protection and verification, the parameters that are required by PDCP for integrity protection may be defined in TS 33.501 and may be input to the integrity protection algorithm. The required inputs to the integrity protection function may include the COUNT value, and DIRECTION (e.g., direction of transmission). The parameters required by PDCP and which are provided by upper layers may include BEARER (e.g., defined as the radio bearer identifier in TS 33.501, and using the value RB identity −1 as in TS 38.331), and KEY (the integrity protection keys for the control plane and for the user plane may be $K_{RRCint}$ and $K_{UPint}$, respectively). At transmission the UE may compute the value of the MAC-I field and at reception it may verify the integrity of the PDCP Data PDU by calculating the X-MAC based on the input parameters as specified. If the calculated X-MAC corresponds to the received MAC-I, integrity protection may be considered to have been verified successfully.

According to 3GPP TS 24.501 v.16.1.0, in the case of dual connectivity for a UE, if the Integrity Protection is set to "Preferred", the Master NG-RAN node may modify the SMF when it cannot fulfil a User Plane Security Enforcement with a value of Preferred. The SMF handling of the PDU session with respect to the Integrity Protection status is up to SMF implementation decision.

For this specification version, when UP security policy indicates that UP IP="preferred" and if the SMF has enabled UP-IP for a PDU session, for a gNB acting as master node (MN), when an eNB could be added as a secondary node (SN), there may be no way for the SMF to utilize the full benefit of adding the SN (eNB), e.g., as the PDU session with UP-IP enabled could not be offloaded to the SN. Accordingly, it may be beneficial to provide the SMF with the ability to modify the UP-IP enablement and disablement for PDU sessions with UP security policy set to "preferred". This may affect 5G core based dual connectivity (NR master—eUTRA secondary) and 5G core based dual connectivity (eUTRA master—NR secondary) network options, according to some embodiments.

To implement such capability, when the SMF (MN) knows that the SN does not support UP-IP, then the SMF may be able to take a decision to change the UP security policy from "preferred" to "not needed". This may facilitate data being split between the master cell group (MCG) and secondary cell group (SCG) in dual connectivity scenarios. Further, it may be the case that for any new PDU session initiated (e.g., at least in a dual connectivity scenario with NR and eUTRA cells), the SMF should not enable UP-IP, unless UP security policy is set to "required". This could be done in multiple ways. As one possibility, the SMF could change the UP security policy from "preferred" to "not needed" by providing a PDU session release command followed by a network-initiated PDU session establishment request. As another possibility, the SMF could provide a PDU session modification command to change the UP-IP policy from "preferred" to "not needed". It may be the case that a 3GPP specification change to allow the SMF to change the UP-IP policy during the lifetime of a PDU session (e.g., possibly only if it is set to "preferred" or "not needed") may be useful to support such a possibility. For example, a 3GPP 23.501 portion that reads "User Plane Security Enforcement information applies only over 3GPP access. Once determined at the establishment of the PDU Session the User Plane Security Enforcement information applies for the life time of the PDU Session" could be modified to instead read "User Plane Security Enforcement information applies only over 3GPP access. Once determined at the establishment of the PDU Session the User Plane Security Enforcement information applies for the life time of the PDU Session, if and only if UP-IP is set to 'required'". This may provide the SMF with flexibility to enable and disable UP-IP for PDU sessions that have UP security policy set to "preferred".

Figure 8:
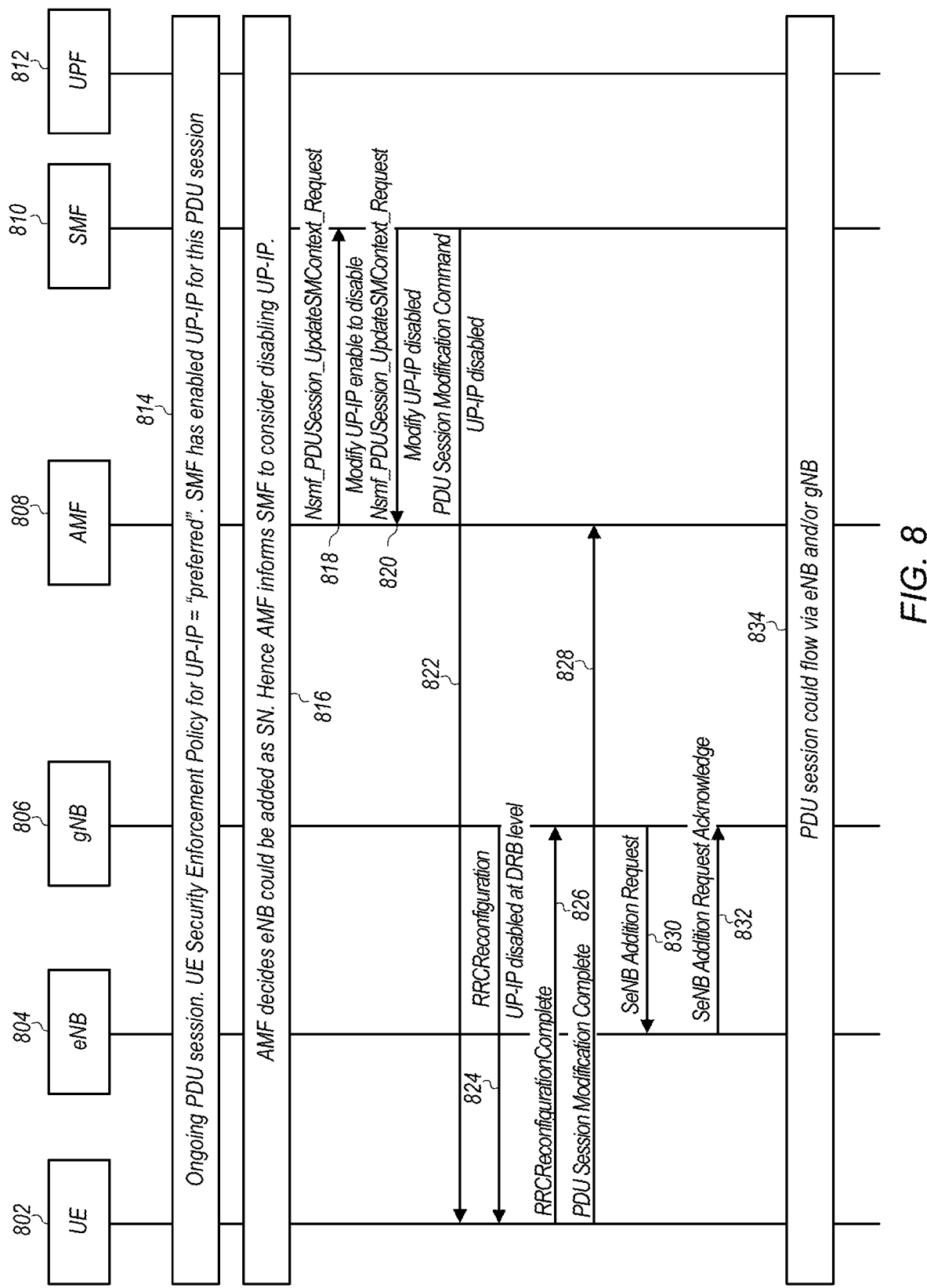
FIG. 8 is a call flow diagram illustrating possible signaling that could be used to perform a UP security policy modification, at least according to some embodiments.

FIG. 8 is a call flow diagram illustrating possible signaling that could be used to perform such a UP security policy modification, at least according to some embodiments. As shown, the call flow may be performed between a UE 802, eNB 804, gNB 806, AMF 808, SMF 810, and UPF 812. In 814, an ongoing PDU session may be in progress, with UE security enforcement policy for UP IP set to preferred, and UP IP enabled. In 816, The AMF 808 may decide that the eNB 804 could be added as a secondary node, and informs the SMF 810 to facilitate potentially disabling UP IP for the PDU session. In particular, in 818, the AMF 808 may send a "Nsmf_PDUSession_UpdateSMContext_Request" message to the SMF 810, indicating to modify UP IP from enable to disable, and in 820, the SMF 810 may send a "Nsmf_PDUSession_UpdateSMContext_Request" message to the AMF 808, indicating that UP IP has been disabled for the PDU session. In 822, the SMF 810 may send a PDU session modification command to the UE 801 indicating that UP IP is disabled for the PDU session. In 824, the gNB 806 may indicate to the UE 802 that UP IP is disabled at the DRB level via RRCReconfiguration message, and in 826, the UE 802 may respond with a RRCReconfigurationComplete message. In 828, the UE may indicate to the AMF 808 that the PDU session modification is complete. In 830, the gNB 806 may send a SeNB addition request message to the eNB 804, which may respond with a SeNB addition request acknowledge message in 832. In 834, the PDU session may be able to flow via the eNB 804 or the gNB 806.

In a situation in which a UE has an active PDU session with UP IP policy set to "preferred" and UP IP activated, there may be various possible scenarios in which it may be possible to assist the SMF to decide when to dynamically modify the UP IP policy and/or whether UP-IP is enabled or disabled. As one such scenario, if a UE moves to poor NR coverage such that a potential iRAT triggering condition (e.g., B1 threshold and/or B2 threshold) is met, and the UE sends a measurement report (MR) indicating such to the NG-RAN, the NG-RAN may inform the SMF (e.g., via AMF) about the potential mobility of the UE to EPC connectivity. In such a case, the SMF may change the policy of the UP IP sessions active in the UE via PDU session modification command(s) with new Mapped EPS Bearer Contexts information, with an IE indicating it is for iRAT mobility to LTE. The UE may reply with a PDU session modification complete message, after which the NG-RAN may proceed with the iRAT mobility to LTE, e.g., if a time-to-trigger (TTT) condition is satisfied.

Figure 9:
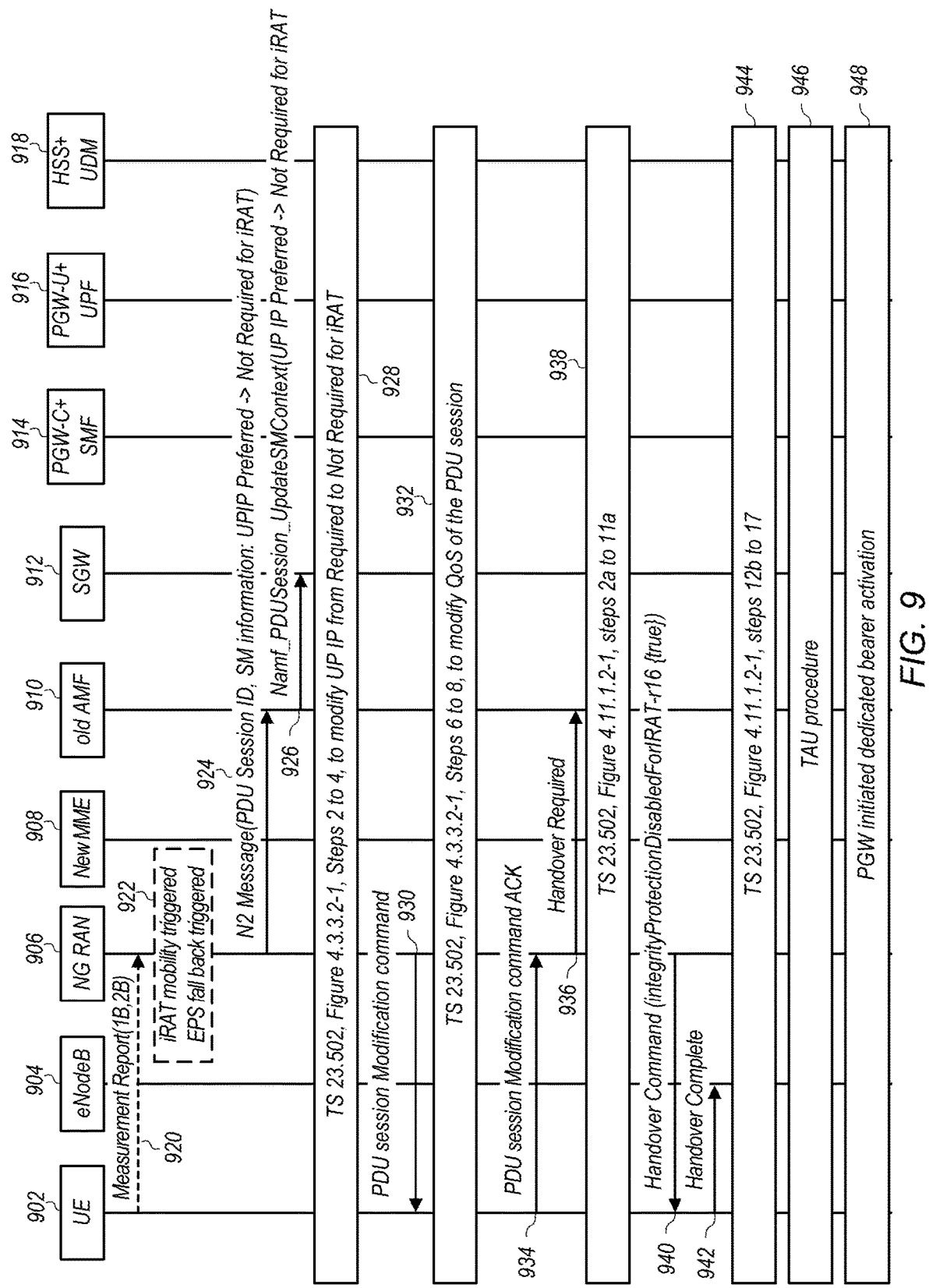
FIG. 9 is a call flow diagram illustrating possible signaling that could be used to perform a UP security policy modification and to provide new Mapped EPS Bearer Contexts information, at least according to some embodiments.

FIG. 9 is a call flow diagram illustrating possible signaling that could be used to perform such a UP security policy modification and to provide new Mapped EPS Bearer Contexts information, at least according to some embodiments. As shown, the call flow may be performed between a UE 902, eNB 904, NG RAN 906, new MME 908, old AMF 910, SGW 912, PGW-C+SMF 914, PGW-U+UPF 916, and HSS+UDM 918. In 920, the UE 902 may send a measurement report to the NG RAN 906. Based on the measurement report, in 922, iRAT mobility may be triggered, and EPS fall back may be triggered. In 924, the NG RAN 906 may send a N2 message to the old (exiting) AMF 910. In 926, the AMF 910 may send a "Namf_PDUSession_UpdateSMContext" message indicating UPIP Preferred not required for iRAT to the SGW 912. In 928, steps 2-4 of FIG. 4.3.3.2-1 in 3GPP TS 23.502 may be performed to modify UP IP from Required to Not Required for iRAT. In 930, the NG RAN 906 may provide a PDU session modification command to the UE 902. In 932, steps 6-8 of FIG. 4.3.3.2-1 in 3GPP TS 23.502 may be performed to modify the QoS of the PDU session. In 934, the UE 902 may provide a PDU session modification command acknowledgement message to the NG RAN 906. In 936, the NG RAN 906 may indicate to the AMF 910 that handover is required. In 938, steps 2a-11a of FIG. 4.11.1.2-1 in 3GPP TS 23.502 may be performed. In 940, the NG RAN 906 may provide a handover command (with integrityProtectionDisabledForIRAT-r16 set to true) to the UE 902. In 942, the UE 902 may provide a handover complete message to the eNB 904. In 944, steps 12b-17 of FIG. 4.11.1.2-1 in 3GPP TS 23.502 may be performed. In 946, a TAU procedure may be performed, and in 948, PGW initiated dedicated bearer activation may be performed.

Additionally, FIGS. 10A-10B illustrate a possible IE that could be used in a NR RRC message to indicate that UP IP is disabled for the purposes of iRAT mobility (e.g., using the "integrityProtectionDisabledForIRAT-r16" field 1002, as shown), according to some embodiments.

The "Mapped EPS Bearer Contexts" IE may be sent by the network to a UE in a 3GPP 5G NR cellular communication scenario, according to some embodiments, such as in the preceding example scenario. However, a UE may include this IE in only one message, the PDU Session Modification Request, at least according to some embodiments. The Mapped EPS Bearer Contexts IE may contain multiple parameters, such as EPS Bearer ID, Mapped EPS Bearer QoS (e.g., ARP, GBR, MBR, QCI), PGW-U tunnel information, and traffic flow template (TFT). In some scenarios, the "MBR" for a particular EPS Bearer ID (EBI) shared by the SMF may not be supported by a UE in EPC communication, for example, the MBR may be too high for the LTE UE capability. In such a scenario, it may be beneficial to support the ability of the UE to request modification of the particular EBI using the Mapped EPS Bearer Contexts. For example, it may be useful to support a UE sending a PDU Session Modification Request with a Mapped EPS Bearer Contexts IE to request a modification of a QoS Flow description for a PDU session. As one possibility to introduce such support, a 3GPP specification change may be made to 3GPP 24.501 to replace the text at 8.3.7.10 Mapped EPS bearer contexts from "This IE is included when the UE requests to delete one or more mapped EPS bearer contexts" to "This IE is included when the UE requests to delete or modify one or more mapped EPS bearer contexts". An explicit IE may be introduced to indicate whether such a Mapped EPS Bearer Context IE is for deletion or modification.

Note, though, that to support the ability of the network to reject such a request to modify EPS Bearer Contexts, it may be useful to further provide an explicit cause code to convey the correct reasons related to EPC. For example, 3GPP TS 24.501 v.16.1.0 illustrates a list of possible cause codes that can be included in a PDU session modification reject message, according to some embodiments, of which the only cause code related to EPS Bearer Contexts is "Invalid mapped EPS bearer identity".

Consider a scenario in which a network sends a UE a Mapped EPS Bearer Contexts IE containing 2 Bearer IDs, of which the UE can comply with the mapped EPS bearer context for EBI 1 but cannot comply with the mapped EPS bearer context for EBI 2, e.g., due to the MBR being too high for EPS for the UE. The UE may send a Mapped EPS Bearer Contexts IE of a PDU Session Modification Request with the below container:

EPS Bearer ID-2

Mapped EPS Bearer QoS—MBR (New Value)

The network may not identify the new MBR value. In this case, as the only cause code related to EPS Bearer Contexts that is available for a PDU session modification reject message is "Invalid mapped EPS bearer identity", so the network may reject using this cause code. In this case, the UE may end up sending a PDN connectivity request in EPS with the MBR values, but the EPC may send a PDN connectivity reject message with a cause code "EPS QoS not accepted" due to the incorrect MBR value. This may result in the UE going into a loop sending repeated PDN connectivity requests without obtaining data connectivity.

To avoid (or at least reduce the likelihood of) such a scenario, a new 5GSM cause code related to Mapped EPS Bearer Contexts may be added. The new cause code could include "Invalid Mapped EPS Bearer QoS", as one possibility. If such a cause code is included in the 5GSM cause codes, the network may be able to provide it to more clearly indicate to a UE when a PDU session modification rejection is due to an invalid Mapped EPS Bearer QoS (e.g., rather than an invalid EPS bearer ID), which may allow the UE to include the correct QoS in a subsequent PDU Session Modification Request.

According to some embodiments, another 5GSM cause code that may be useful to introduce may include a "Fallback to EPS" cause code. For example, such a cause code may be used when a network provides a PDU session release command to a UE, e.g., to abruptly inform the UE to fall back to the legacy RAT in case of 5GC network congestion or an error. 3GPP TS 24.501 v.16.1.0 illustrates a list of possible cause codes that can currently be included in a PDU session release command message, according to some embodiments, which notably do not include the proposed "Fallback to EPS" cause code. Such a cause code may be used in conjunction with the RAN providing RRCRelease with "EARFCN" information in a redirection IE. In addition or as an alternative to using such a PDU session release command and cause code in case of detecting core network congestion, this may be useful when a particular service (e.g., eMBMS/NILR) may not be supported on the 5GC network, but may be supported on EPS.

Thus, for any service/application which 5GS does not support, with the help of the proposed 5GSM cause code "Fallback to EPS", a UE can be redirected to EPS from the NAS level. For example, currently, if the 5GC network does not support voice calling, IMS voice signaling may happen in the 5GC network and the conversational voice call dedicated bearer is established in LTE, thus the IMS procedure may be split between the 5GC and the EPC networks. But, with the proposed 5GSM cause code "Fallback to EPS", once IMS voice signaling is triggered, the 5G NAS may send this cause code to the UE. The UE may accordingly fallback to LTE at the NAS level, and both IMS signaling and the conversational voice call bearer can be established in LTE. Further, similar techniques may be used in conjunction with any of various possible services that are not supported in a 5GC network but are supported in an EPC network, such as potentially "Supplementary Services/XCAP".

Figure 11:
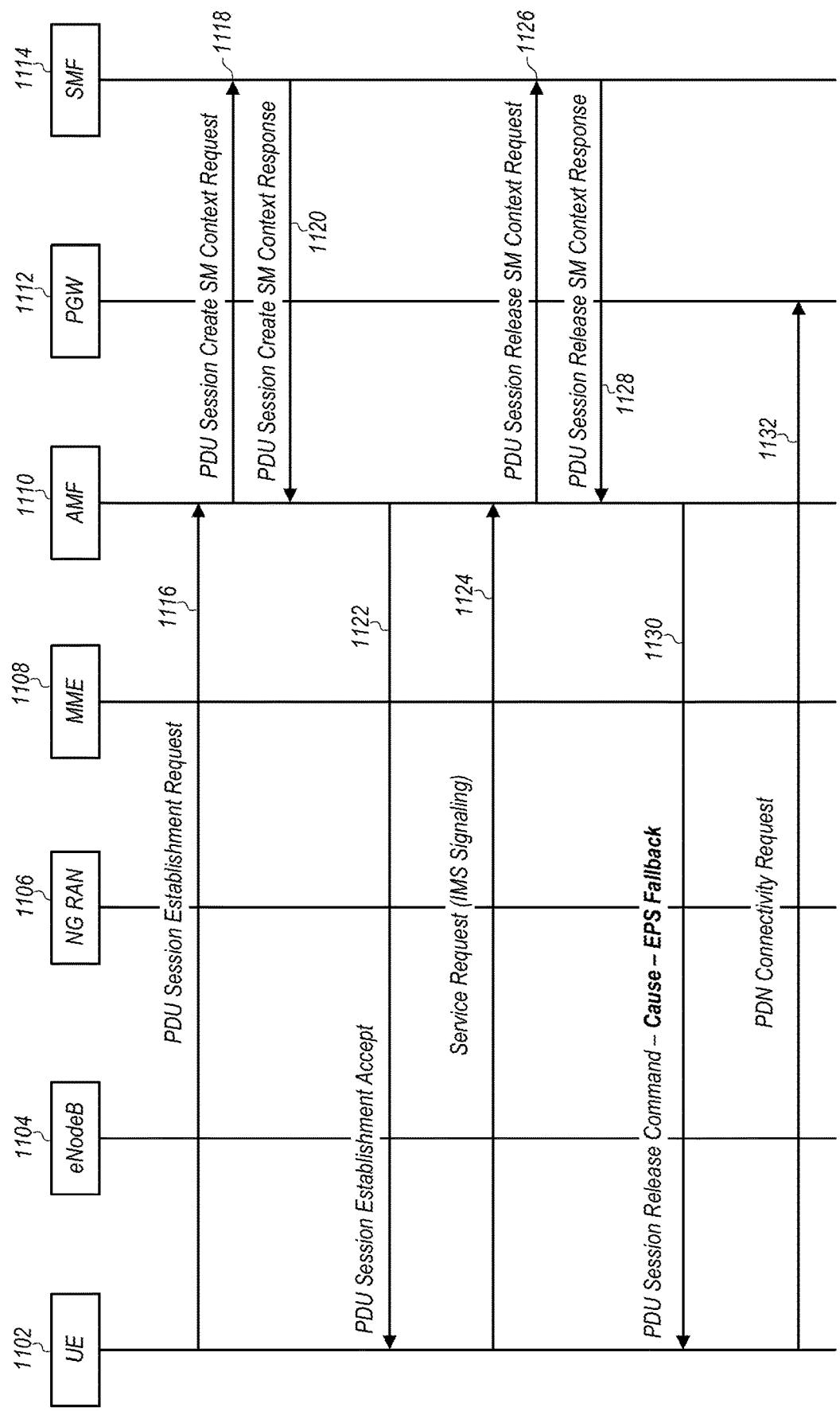
FIG. 11 is a call flow diagram illustrating possible signaling that could be used to perform a PDU session release with a cause code indicating to perform EPS fallback, according to some embodiments.

FIG. 11 is a call flow diagram illustrating possible signaling that could be used to perform such a PDU session release with a cause code indicating to perform EPS fallback, at least according to some embodiments. As shown, the call flow may be performed between a UE 1102, eNB 1104, NG RAN 1106, MME 1108, AMF 1110, PGW 1112, and SMF 1114. In 1116, the UE may send a PDU Session Establishment Request message to the AMF 1116. In 1118, the AMF may send a PDU Session Create SM Context Request message to the SMF 1114. In 1120, the SMF 1114 may send a PDU Session Create SM Context Response message to the AMF 1110. In 1122, the AMF may send a PDU Session Establishment Accept message to the UE 1102. In 1124, the UE 1102 may send a service request to the AMF 1110. The AMF may determine that the service request is not supported via the 5GC network, and in 1126 may provide a PDU Session Release SM Context Request to the SMF 1114. In 1128, the SMF 1114 may provide a PDU Session Release SM Context Response to the AMF 1110. In 1130, the AMF 1110 may provide a PDU Session Release Command to the UE 1102, with a cause indicated as EPS Fallback. In 1132, the UE 1102 may accordingly send a PDU Connectivity Request to the PGW 1112, e.g., to re-establish the PDU session via EPS.

Still further, there may be scenarios in which it may be beneficial to support provision of a "Mapped EPS Bearer Contexts" IE in a PDU session release command. For example, consider a 5G standalone network with a N26 interface between the 5GC and EPC networks. The network may send a "Mapped EPS Bearer Contexts" IE in the PDU Session Establishment Accept message. While a PDU session is ongoing and the UE is mobile, the UE may move to a location in which the EPC is present. If the 5GC network experiences congestion (or for any of various other possible reasons), the SMF may decide to release the PDU session, and may send a PDU Session Release Command to send the UE to LTE, and any UP-IP sessions may be released in the 5GC network. In this case, there is a possibility where the SMF could modify the UP-IP conditions for certain PDU sessions prior to release. Accordingly, it may be beneficial to provide the "Mapped EPS Bearer Contexts" IE in the PDU Session Release command message. This may allow for the SMF to make changes to UP-IP values just before the PDU session is released. For example, for an ongoing PDU session with UP IP policy set to "preferred", for which UP IP is enabled, since LTE does not support UP IP, the policy may be modified by the SMF before PDU session release, so that the UE could perform handover of the PDU session to LTE. Thus, a "Mapped EPS Bearer Contexts" IE may be included in the PDU Session Release command message when the SMF decides to change the UP IP policy due to fallback to EPC, e.g., to better support the ability of the UE to continue the PDU session in the EPC. As previously noted, at least according to some embodiments, the Mapped EPS Bearer Contexts IE may include parameters for EPS Bearer ID, Mapped EPS Bearer QoS, PGW-U tunnel information, and TFT.

Figure 13:
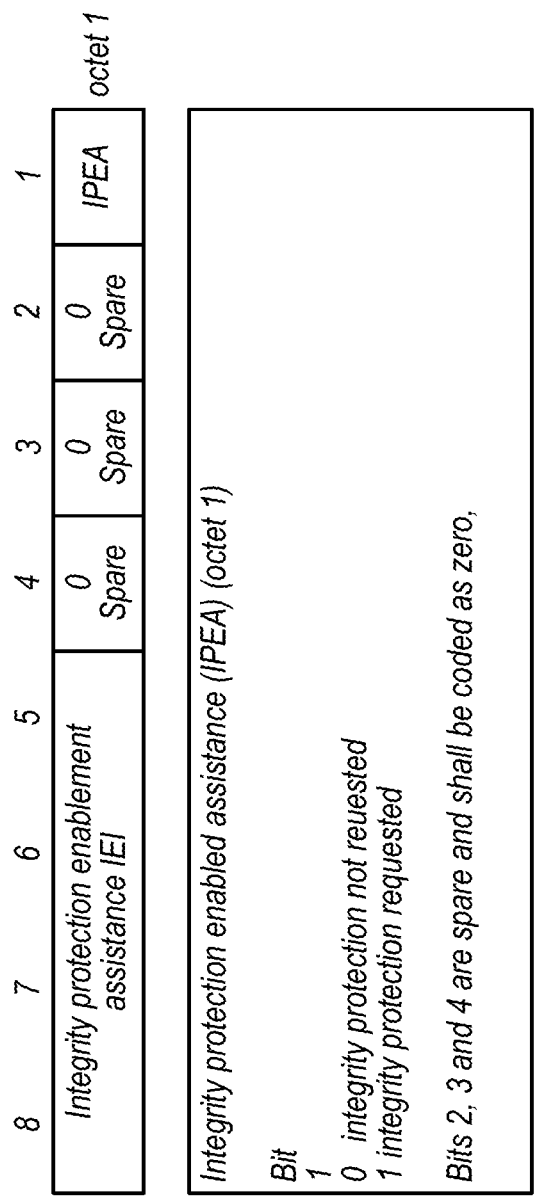
FIG. 13 illustrates how an Integrity protection enablement assistance information element could be coded, according to some embodiments.

In addition (or alternatively) to various possible techniques for various aspects of UP IP and QoS behavior on the network side, various techniques for supporting UP IP and QoS handling may also be possible on the UE side. As one such possible technique, it may be possible to support provision by a UE of assistance information relating to whether to enable integrity protection for a PDU session. For example, the SMF may determine, at PDU session establishment, UP security enforcement information for the UP of a PDU session. The UP security enforcement information may be selected based on one or more of a subscribed UP security policy, which may be part of SM subscription information received from the UDM function of the cellular network, and UP security policy information locally configured per (DNN, S-NSSAI) in the SMF that may be used when the UDM does not provide UP security policy information, and the maximum supported data rate per UE for integrity protection for the DRBs, e.g., provided by the UE as part of the 5GSM capability IE during PDU session management. In addition, in the PDU session establishment request and/or in a PDU session modification request, a new IE could be added to give assistance information to the SMF to indicate a request to enable UP IP, or to indicate a request to not enable UP IP. The SMF may evaluate this "hint" as part of the UP security policy local configuration. A description of such a new IE could be included in 3GPP TS 24.501 8.3.1.6; and/or Table 8.3.7.1.1 in 3GPP 24.501 8.3.7.1 could be modified to include a message definition for an Integrity Protection Enablement Assistance message, such as in the table illustrated in FIG. 12; and/or a section 9.11.4.xx "Integrity protection enablement assistance" may be provided, e.g., potentially including further description of such a new IE. Such a section could read as follows, or similarly, at least as one possibility:

The purpose of the Integrity protection enablement assistance information element is to indicate whether Integrity protection for a PDU session is requested to be used by UE.
  The Integrity protection enablement assistance is coded as shown in FIG. 13.
  The Integrity protection enablement assistance is a type 1 information element.

As previously noted herein, when UP IP is enabled for a PDU session (e.g., under a "Required" or "Preferred" UP security policy) between a 5GC network and a UE, it may be the case that the PDU session is not allowed to be transferred to an EPC network as UP IP may not be supported on the EPC network. For a PDU session with a "Preferred" UP security policy, it may be possible for a UE to transfer the PDU session with UP IP disabled. Accordingly, it may be possible for a UE to check the UP IP type and/or status (e.g., "preferred" or "not needed", enabled or disabled) of a PDU session before performing mobility from a 5GC network to a EPC network, possibly to modify the UP IP type and/or status, and for the manner in which the mobility is performed with respect to the PDU session to vary depending on the UP IP type and/or status.

For example, consider a scenario in which a UE has an active PDU session with UP IP set to "preferred" and UP IP activated. Upon the UE moving into poor NR coverage and UE iRAT mobility being triggered, the UE may trigger a "PDU Session Modification Request" to check if the PDU session(s) can be modified from UP IP enabled to UP IP disabled. The AMF may notify the SMF to trigger the PDU session modification procedure, and the SMF may respond, either accepting the proposed PDU session modification such that UP IP is disabled for the PDU session(s), or rejecting the proposed PDU session modification such that UP IP remains enabled for the PDU session(s). If the UP IP is disabled for the PDU session(s), the 5GS to EPS mobility may be performed with PDU session handover. If UP IP remains enabled for the PDU session(s), the 5GS to EPS mobility may be performed without PDU session handover (e.g., such that a new/initial PDN connectivity request may be made to replace the PDU session).

Figure 14:
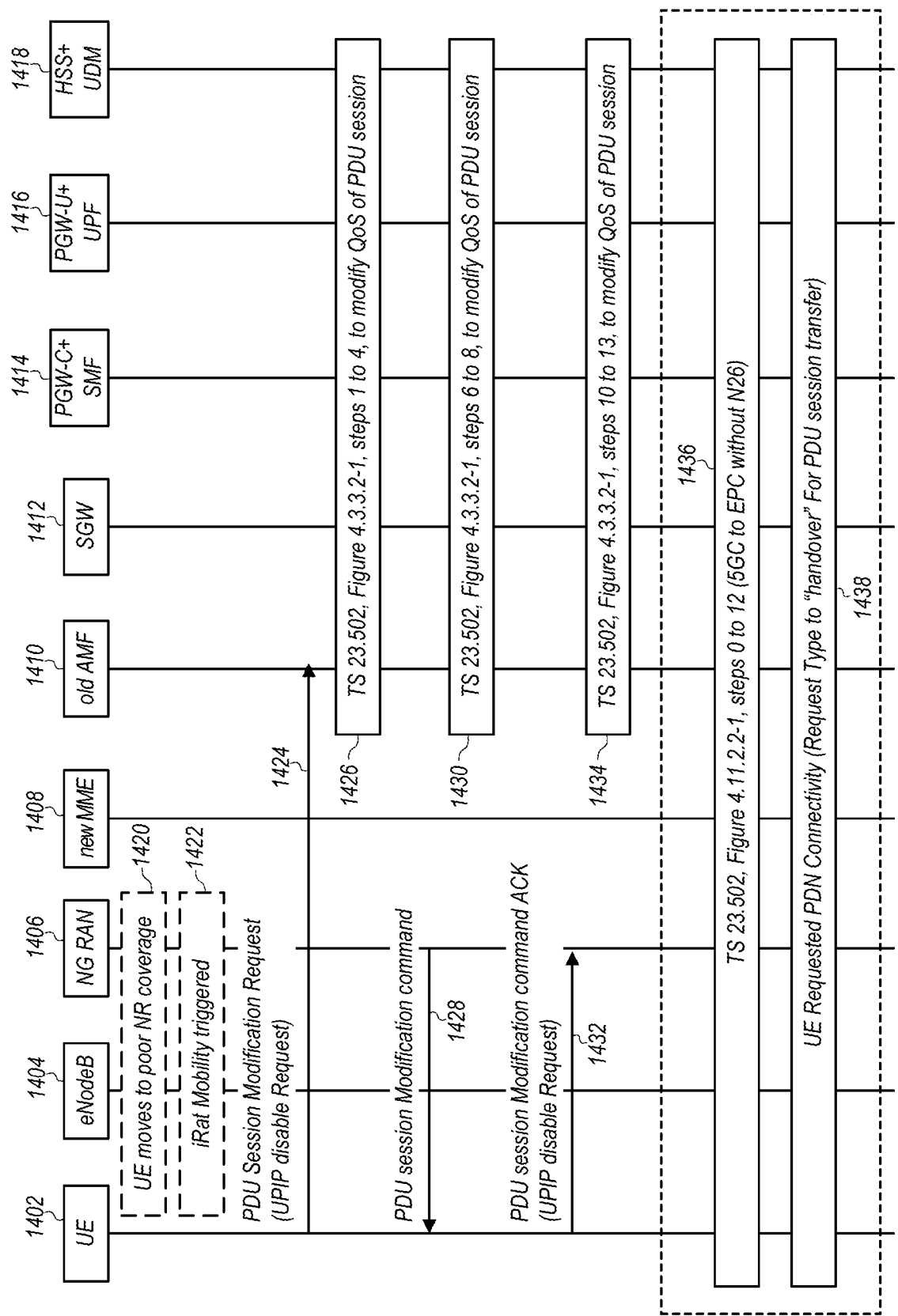
FIG. 14 is a call flow diagram illustrating possible signaling that could be used to perform a PDU session modification request to disable UP IP and 5GS to EPS handover in a scenario in which the PDU session modification request is accepted, according to some embodiments.

FIG. 14 is a call flow diagram illustrating possible signaling that could be used to perform such a PDU session modification request and 5GS to EPS handover in a scenario in which the PDU session modification request is accepted, at least according to some embodiments. As shown, the call flow may be performed between a UE 1402, eNB 1404, NG RAN 1406, new MME 1408, old AMF 1410, SGW 1412, PGW-C+SMF 1414, PGW-U+UPF 1416, and HSS+UDM 1418. In 1420, the UE 1402 may move into poor NR coverage, and in 1422, iRAT mobility may be triggered. In 1424, the UE 1402 may send a PDU Session Modification Request (e.g., to disable UP IP) to the old (exiting) AMF 1410. In 1426, steps 1-4 of FIG. 4.3.3.2-1 in 3GPP TS 23.502 may be performed to modify the QoS of the PDU session. In 1428, the NG RAN may provide a PDU Session Modification Command to the UE 1402. In 1430, steps 6-8 of FIG. 4.3.3.2-1 in 3GPP TS 23.502 may be performed to modify the QoS of the PDU session. In 1432, the UE 1402 may provide a PDU Session Modification Command Acknowledgement message to the NG RAN 1406. In 1434, steps 10-13 of FIG. 4.3.3.2-1 in 3GPP TS 23.502 may be performed to modify the QoS of the PDU session. In 1436, steps 0-12 of FIG. 4.11.2.2-1 in 3GPP TS 23.502 may be performed for 5GC to EPC handover without N26 interface. In 1438, the UE 1402 may request PDN connectivity (e.g., using "handover" request type for PDU session transfer).

Figure 15:
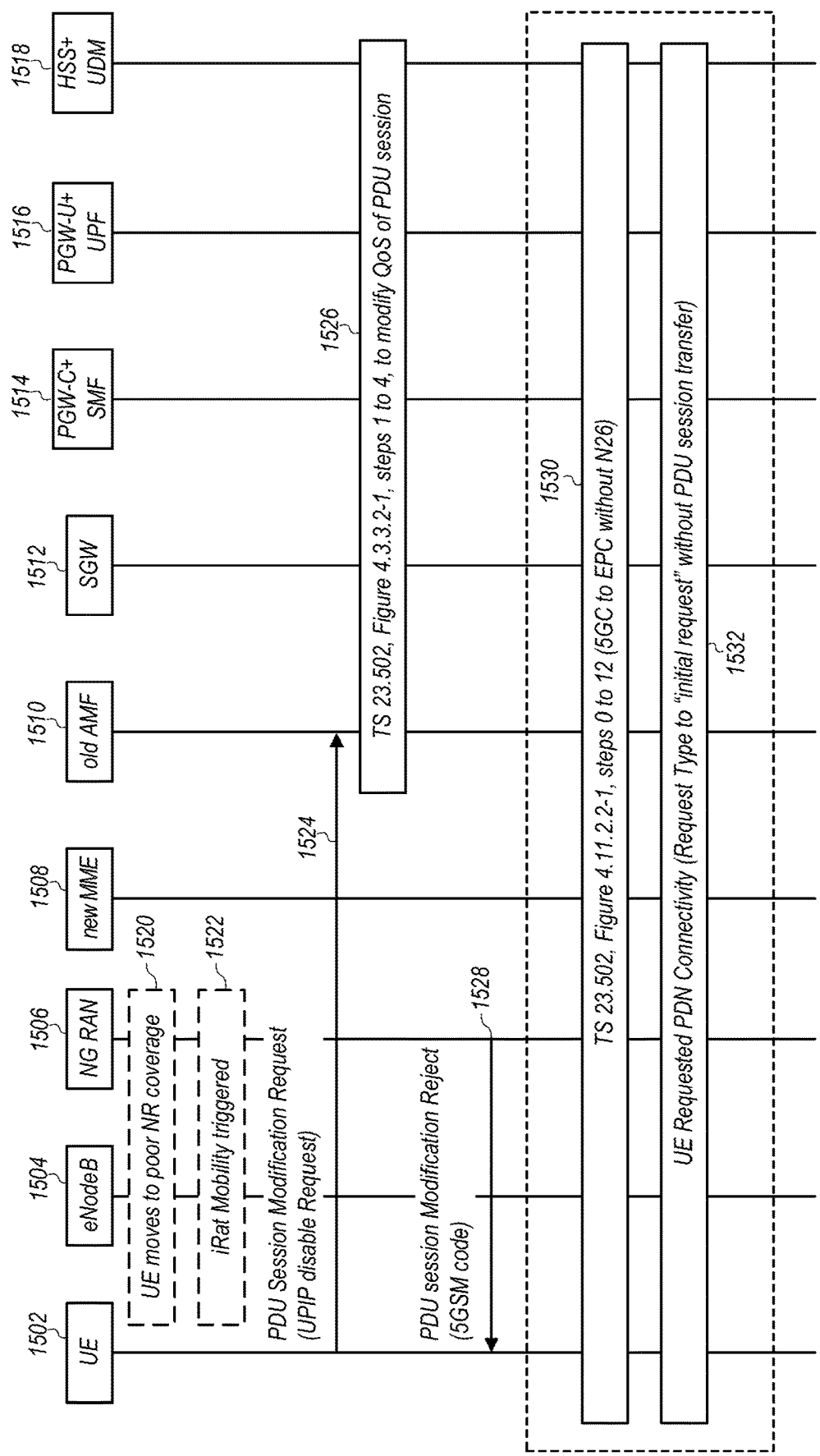
FIG. 15 is a call flow diagram illustrating possible signaling that could be used to perform a PDU session modification request to disable UP IP and 5GS to EPS handover in a scenario in which the PDU session modification request is rejected, according to some embodiments.

FIG. 15 is a call flow diagram illustrating possible signaling that could be used to perform such a PDU session modification request and 5GS to EPS handover in a scenario in which the PDU session modification request is rejected, at least according to some embodiments. As shown, the call flow may be performed between a UE 1502, eNB 1504, NG RAN 1506, new MME 1508, old AMF 1510, SGW 1512, PGW-C+SMF 1514, PGW-U+UPF 1516, and HSS+UDM 1518. In 1520, the UE 1502 may move into poor NR coverage, and in 1522, iRAT mobility may be triggered. In 1524, the UE 1502 may send a PDU Session Modification Request (e.g., to disable UP IP) to the old (exiting) AMF 1510. In 1526, steps 1-4 of FIG. 4.3.3.2-1 in 3GPP TS 23.502 may be performed to modify the QoS of the PDU session. In 1528, the NG RAN may provide a PDU Session Modification Reject message (including 5GSM code indicating cause information for the rejection) to the UE 1502. In 1530, steps 0-12 of FIG. 4.11.2.2-1 in 3GPP TS 23.502 may be performed for 5GC to EPC handover without N26 interface. In 1532, the UE 1502 may request PDN connectivity (e.g., using "initial request" request type without PDU session transfer).

In some embodiments, it may be beneficial for a UE to be able to change some QoS rules of a PDU session, e.g., based on mobility to EPC and/or RF conditions. For example, consider a scenario in which multiple different QoS flows of a PDU session between a 5GC network and a UE are active, where some QoS flows cannot be fulfilled in EPC or bad NR coverage. In such a scenario, the UE could trigger a PDU session modification request to change the QoS rules for the PDU session, for example to cause them to be in condition to be supported by the EPC network or by the 5GC network in view of the current RF conditions. Further, it may be possible for the UE to determine how to perform 5GS to EPS mobility with respect to the PDU session based at least in part on whether such modifications are successful (e.g., depending on whether all QoS flows can be modified such that they can be supported by the EPC network).

For example, consider a scenario in which a UE has an active PDU session, for which QoS flows may not be fulfilled by QoS of an EPC network. Upon the UE moving into poor NR coverage (and/or LTE coverage being better than NR coverage), the UE may start a local timer and begin creating a new local QoS rules of the ongoing PDU session for the QoS modification request. The QoS rules may be determined based on UE local policy, and may be based on the specific coverage scenario (e.g., for iRAT mobility to EPC or poor NR coverage without iRAT mobility being triggered). The UE may trigger a "PDU Session Modification Request" to request the new QoS flow description(s) after the timer expires and/or upon RF condition deterioration. The SMF may respond, either accepting the proposed PDU session modification such that the new QoS rules are accepted, or rejecting the proposed PDU session modification such that the previous QoS rules remain in place for the PDU session(s). If the new QoS rules are accepted for the PDU session(s), the 5GS to EPS mobility may be performed with PDU session handover. If the new QoS rules are not accepted for the PDU session(s), the 5GS to EPS mobility may be performed without PDU session handover (e.g., such that a new/initial PDN connectivity request may be made to replace the PDU session).

Figure 16:
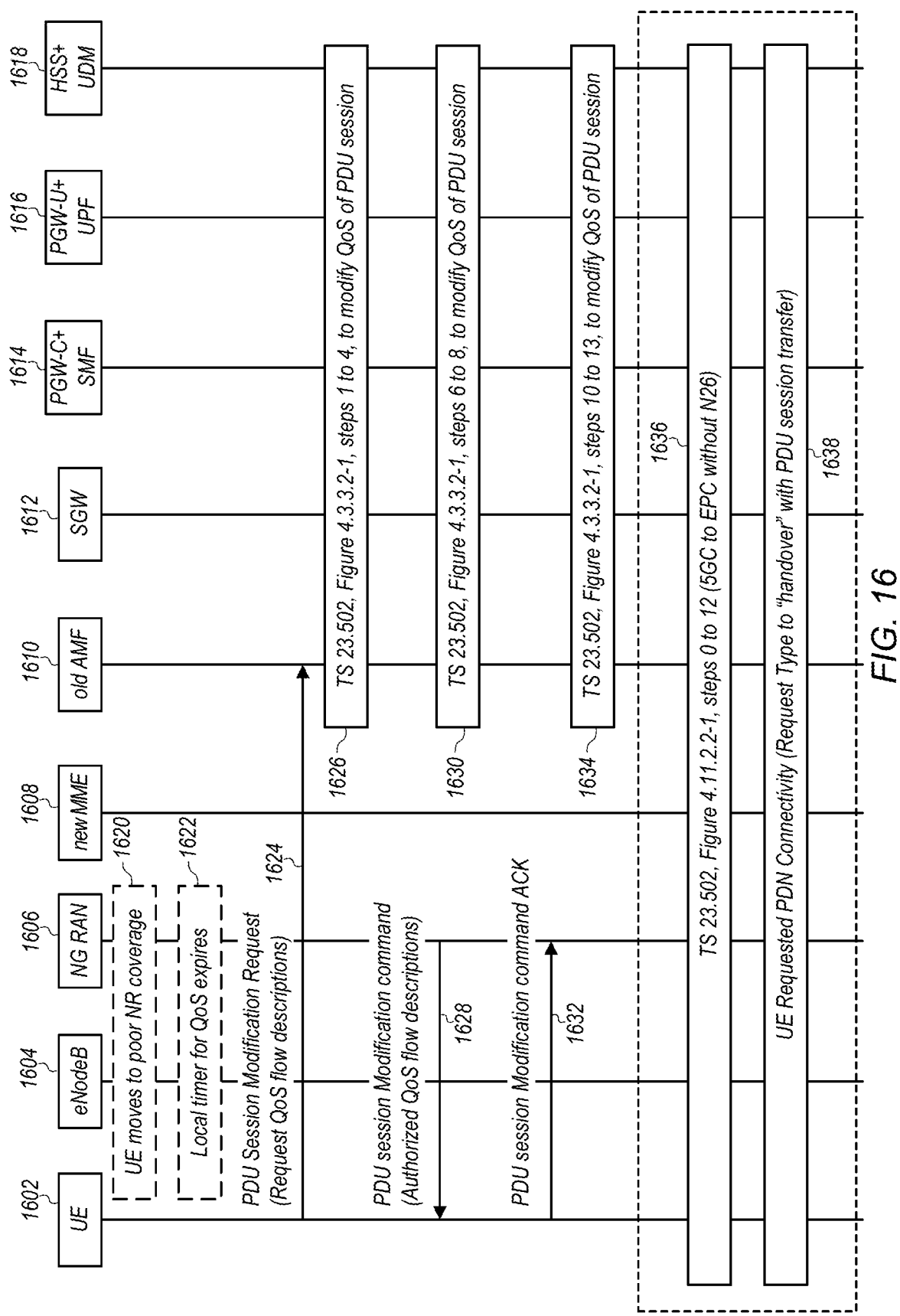
FIG. 16 is a call flow diagram illustrating possible signaling that could be used to perform a PDU session modification request to modify QoS rules and 5GS to EPS handover in a scenario in which the PDU session modification request is accepted, according to some embodiments.

FIG. 16 is a call flow diagram illustrating possible signaling that could be used to perform such a PDU session modification request and 5GS to EPS handover in a scenario in which the PDU session modification request is accepted, at least according to some embodiments. As shown, the call flow may be performed between a UE 1602, eNB 1604, NG RAN 1606, new MME 1608, old AMF 1610, SGW 1612, PGW-C+SMF 1614, PGW-U+UPF 1616, and HSS+UDM 1618. In 1620, the UE 1602 may move into poor NR coverage, and in 1622, the local timer for QoS may expire. In 1624, the UE 1602 may send a PDU Session Modification Request (e.g., to request QoS flow descriptions) to the old (exiting) AMF 1610. In 1626, steps 1-4 of FIG. 4.3.3.2-1 in 3GPP TS 23.502 may be performed to modify the QoS of the PDU session. In 1628, the NG RAN may provide a PDU Session Modification Command to the UE 1602, indicating authorized QoS flow descriptions. In 1630, steps 6-8 of FIG. 4.3.3.2-1 in 3GPP TS 23.502 may be performed to modify the QoS of the PDU session. In 1632, the UE 1602 may provide a PDU Session Modification Command Acknowledgement message to the NG RAN 1606. In 1634, steps 10-13 of FIG. 4.3.3.2-1 in 3GPP TS 23.502 may be performed to modify the QoS of the PDU session. In 1636, steps 0-12 of FIG. 4.11.2.2-1 in 3GPP TS 23.502 may be performed for 5GC to EPC handover without N26 interface. In 1638, the UE 1602 may request PDN connectivity (e.g., using "handover" request type for PDU session transfer).

Figure 17:
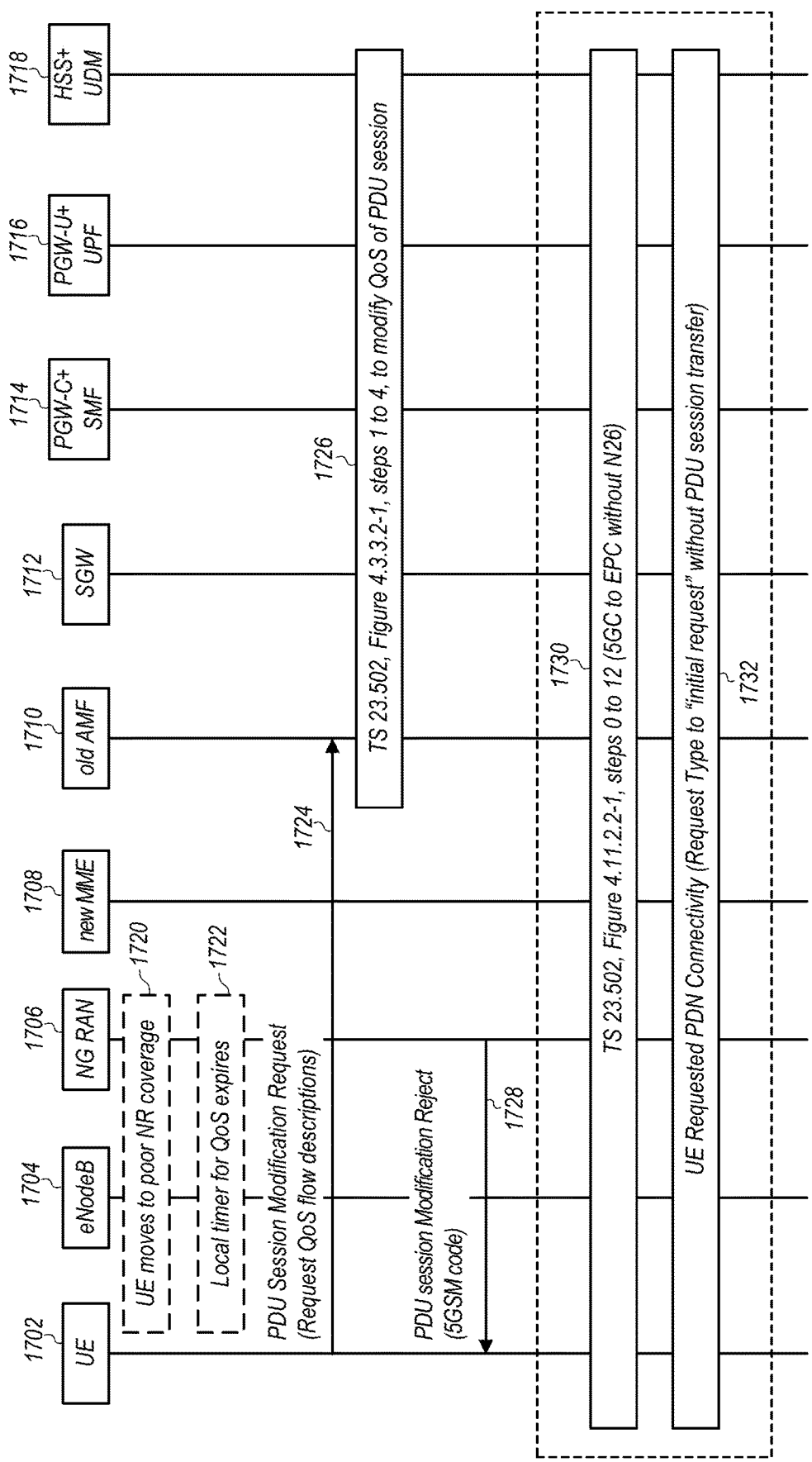
FIG. 17 is a call flow diagram illustrating possible signaling that could be used to perform a PDU session modification request to modify QoS rules and 5GS to EPS handover in a scenario in which the PDU session modification request is rejected, according to some embodiments.

FIG. 17 is a call flow diagram illustrating possible signaling that could be used to perform such a PDU session modification request and 5GS to EPS handover in a scenario in which the PDU session modification request is rejected, at least according to some embodiments. As shown, the call flow may be performed between a UE 1702, eNB 1704, NG RAN 1706, new MME 1708, old AMF 1710, SGW 1712, PGW-C+SMF 1714, PGW-U+UPF 1716, and HSS+UDM 1718. In 1720, the UE 1702 may move into poor NR coverage, and in 1722, the local timer for QoS may expire. In 1724, the UE 1702 may send a PDU Session Modification Request (e.g., to request QoS flow descriptions) to the old (exiting) AMF 1710. In 1726, steps 1-4 of FIG. 4.3.3.2-1 in 3GPP TS 23.502 may be performed to modify the QoS of the PDU session. In 1728, the NG RAN may provide a PDU Session Modification Reject message (including 5GSM code indicating cause information for the rejection) to the UE 1702. In 1730, steps 0-12 of FIG. 4.11.2.2-1 in 3GPP TS 23.502 may be performed for 5GC to EPC handover without N26 interface. In 1732, the UE 1702 may request PDN connectivity (e.g., using "initial request" request type without PDU session transfer).

In some instances, it may be the case that a N26 interface is not supported to provide seamless session continuity during iRAT mobility between EPS and 5GS. While the N26 interface may support iRAT handovers, e.g., by mapping of PDU context and forwarding active data session(s) to the target network, without the N26 interface there may be an opportunity for the UE to assist in the iRAT mobility procedure. For example, the UE may be able to implement a local UE policy/configuration to supply QoS parameters during UE requested default or dedicated bearer establishment. This may be accomplished by the UE storing 5GC QoS characteristics of active PDU sessions locally when triggered to do so by low 5G NR coverage, and then utilizing these parameters during the UE requested default or dedicated bearer resource allocation procedure.

For example, consider a scenario in which a UE has an active PDU session with multiple QoS flows with 5GC network, and there is no N26 interface between the AMF of the 5GC network and the MME of the EPC network. Upon the UE moving into poor NR coverage (e.g., such that UE signal strength falls below a "first" threshold), the UE may store the 5GS QoS parameters (5QI, QFI, GFBR, MFBR, ARP), and/or may map them to EPS QoS parameters, e.g., in accordance with a QoS parameter mapping table. For example, the 5G NR QoS Identifier (5QI) may be mapped to the 4G LTE Quality Class Indicator (QCI), the 5G NR QoS Flow may be mapped to the 4G LTE EPS Bearer, and the 5G NR QoS Flow Identifier (QFI) may be mapped to the 4G LTE EPS Bearer ID (EBI). In some instances, 3GPP TS 23.203 v.16.1.0 Table 6.1.7-A and TS 23.501 v.16.2.0 Table 5.7.4-1 may be used to facilitate the QoS parameter mapping.

If UE signal strength falls below a "second" threshold, the UE may start a local timer. After the timer expires with the UE still being in poor NR coverage, the UE may suspend 5GC operation and follow steps 1-13 5GS to EPS mobility procedure (e.g., in accordance with 3GPP TS 24.502, FIG. 4.11.2.2-1), which may include TAU, initial attach, and default PDN connectivity request procedures. When providing a bearer resource allocation request, the UE may include the captured 5GS QoS parameters, e.g., as mapped to EPS QoS parameters per the mapping table.

Figure 18:
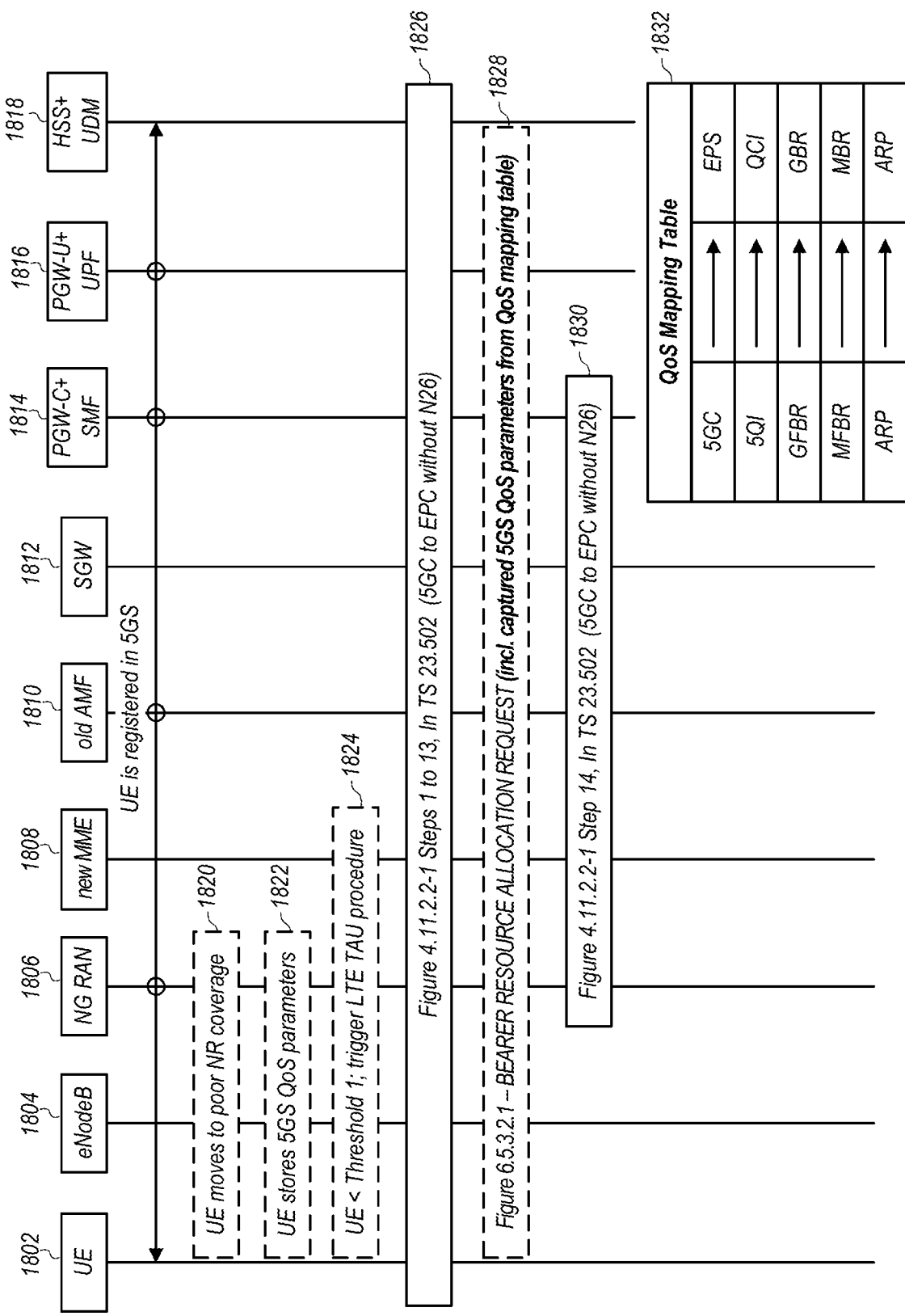
FIG. 18 illustrates a call flow diagram and QoS mapping table that could be used to perform a 5GS QoS parameter capture to facilitate PDU session transfer for 5GS to EPS mobility, according to some embodiments.

FIG. 18 illustrates a call flow diagram and QoS mapping table that could be used to perform such a 5GS QoS parameter capture to facilitate PDU session transfer for 5GS to EPS mobility, at least according to some embodiments. As shown, the call flow may be performed between a UE 1802, eNB 1804, NG RAN 1806, new MME 1808, old AMF 1810, SGW 1812, PGW-C+SMF 1814, PGW-U+UPF 1816, and HSS+UDM 1818. Initially, the UE 1802 may be registered in 5GS. In 1820, the UE 1802 may move into poor NR coverage. In 1822, the UE may store 5GS QoS parameters. In 1824, the UE NR signal strength may cross a configured threshold (e.g., Threshold 1) that triggers a LTE TAU procedure. In 1826, steps 1-13 of FIG. 4.11.2.2-1 in 3GPP TS 23.502 may be performed for 5GC to EPC handover without N26 interface. In 1828, a bearer resource allocation request may be performed, e.g., in accordance with 3GPP TS 23.502 FIG. 6.5.3.2.1, including the captured 5GS QoS parameters (which may be mapped to EPS QoS Parameters using a QoS mapping table such as the QoS mapping table 1832 illustrated in FIG. 18). In 1830, step 14 of FIG. 4.11.2.2-1 in 3GPP TS 23.502 may be performed for 5GC to EPC handover without N26 interface.

In the following further exemplary embodiments are provided.

One set of embodiments may include a wireless device, comprising: at least one antenna; at least one radio coupled to the at least one antenna; and a processor coupled to the at least one radio; wherein the wireless device is configured to: establish a cellular link that provides access to a fifth generation core (5GC) network; establish a protocol data unit (PDU) session with a cellular network entity of the 5GC network; and determine whether user plane integrity protection may be enabled for the PDU session.

According to some embodiments, the wireless device is further configured to: receive an indication that user plane integrity protection may be enabled for the PDU session from the 5GC entity during establishment of the PDU session; and determine that user plane integrity protection may be enabled for the PDU session based at least in part on the indication that user plane integrity protection may be enabled for the PDU session.

According to some embodiments, the wireless device is further configured to: receive a radio resource control (RRC) message indicating that user plane integrity protection is enabled for a data radio bearer; determine that the PDU session is associated with the data radio bearer; determine that user plane integrity protection may be enabled for the PDU session based at least in part on the RRC message indicating that user plane integrity protection is enabled for the data radio bearer and the PDU session being associated with the data radio bearer.

According to some embodiments, the wireless device is further configured to: provide an indication that the wireless device may establish a LTE cellular link as a secondary link to provide access to the 5GC network as part of a Dual Connectivity configuration; and receive an indication to disable user plane integrity protection for the PDU session to utilize the LTE cellular link as a secondary link to provide access to the 5GC network as part of the Dual Connectivity configuration.

According to some embodiments, the wireless device is further configured to: provide a PDU session modification request message to the cellular network entity of the 5GC network, wherein the PDU session modification request comprises a mapped evolved packet service (EPS) bearer contexts information element and requests one or more modifications to the quality of service (QoS) of one or more mapped EPS bearer contexts of the PDU session.

According to some embodiments, the wireless device is further configured to: receive a PDU session modification reject message in response to the PDU session modification request message, wherein the PDU session modification reject message includes a cause code for invalid mapped EPS bearer QoS.

According to some embodiments, the wireless device is further configured to: provide a service request to the 5GC network, wherein the service request is for a service that is not supported by the 5GC network; and receive a PDU session release message indicating to release the PDU session, wherein the PDU session release message includes a cause code indicating to fallback to evolved packet service (EPS).

According to some embodiments, the PDU session release message further includes a mapped EPS bearer contexts information element indicating EPS bearer mapping information for the PDU session.

According to some embodiments, the wireless device is further configured to: provide assistance information associated with the PDU session, wherein the assistance information indicates whether the wireless device requests user plane integrity protection for the PDU session or does not request user plane integrity protection for the PDU session.

Another set of embodiments may include an apparatus, comprising: a processor configured to cause a wireless device to: establish a 5G NR cellular link that provides access to a fifth generation core (5GC) network; establish a protocol data unit (PDU) session with the 5GC network; and determine that inter-RAT mobility from the 5G NR cellular link to a LTE cellular link is triggered; determine whether user plane (UP) integrity protection (IP) is enabled for the PDU session; and determine whether to handover the PDU session to the LTE cellular link or re-establish the PDU session via the LTE link based at least in part on whether UP IP is enabled for the PDU session.

According to some embodiments, the processor is further configured to cause the wireless device to: determine that UP IP is enabled for the PDU session; and provide a PDU session modification request based at least in part on determining that UP IP is enabled for the PDU session and determining that inter-RAT mobility from the 5G NR cellular link to a LTE cellular link is triggered, wherein the PDU session modification request comprises a request to modify the PDU session from UP IP enabled to UP IP disabled.

According to some embodiments, the processor is further configured to cause the wireless device to: receive a PDU session modification command message in response to the PDU session modification request, wherein the PDU session modification command message indicates to modify the PDU session from UP IP enabled to UP IP disabled; and perform PDU session handover when performing inter-RAT mobility from the 5G NR cellular link to a LTE cellular link based at least in part on the PDU session modification command message indicating to modify the PDU session from UP IP enabled to UP IP disabled.

According to some embodiments, the processor is further configured to cause the wireless device to: receive a PDU session modification reject message in response to the PDU session modification request; and re-establish the PDU session via the LTE link when performing inter-RAT mobility from the 5G NR cellular link to a LTE cellular link based at least in part on the PDU session modification reject message.

According to some embodiments, the processor is further configured to cause the wireless device to: determine that one or more QoS flow descriptions of the PDU session are not supported by the LTE cellular link; and provide a PDU session modification request based at least in part on determining that inter-RAT mobility from the 5G NR cellular link to a LTE cellular link is triggered and determining that one or more QoS flow descriptions of the PDU session are not supported by the LTE cellular link, wherein the PDU session modification request comprises a request to modify the QoS flow descriptions of the PDU session.

According to some embodiments, the processor is further configured to cause the wireless device to: receive a PDU session modification command message in response to the PDU session modification request, wherein the PDU session modification command message indicates to modify the QoS flow descriptions of the PDU session as requested; and perform PDU session handover when performing inter-RAT mobility from the 5G NR cellular link to a LTE cellular link based at least in part on the PDU session modification command message indicating to modify the QoS flow descriptions of the PDU session as requested.

According to some embodiments, the processor is further configured to cause the wireless device to: receive a PDU session modification reject message in response to the PDU session modification request; and re-establish the PDU session via the LTE link when performing inter-RAT mobility from the 5G NR cellular link to a LTE cellular link based at least in part on the PDU session modification reject message.

According to some embodiments, the processor is further configured to cause the wireless device to: determine fifth generation service (5GS) to evolved packet service (EPS) QoS parameter mappings for one or more QoS Flows of the PDU session; and provide a bearer resource allocation request including the 5GS to EPS QoS parameter mappings for the one or more QoS Flows of the PDU session when performing the inter-RAT mobility from the 5G NR cellular link to the LTE cellular link.

Yet another set of embodiments may include a cellular network element, comprising: a network port; and a processor coupled to the network port; wherein the cellular network element is configured to: establish a protocol data unit (PDU) session with a wireless device; determine a user plane security policy and one or more quality of service (QoS) flow descriptions for the PDU session with the wireless device; and modify one or more of the user plane security policy or the one or more quality of service (QoS) flow descriptions for the PDU session with the wireless device.

According to some embodiments, to establish the PDU session with the wireless device, the cellular network element is further configured to: receive a PDU session establishment request message from the wireless device; and provide a PDU session establishment accept message to the wireless device, wherein the PDU session establishment accept message comprises an indication of whether user plane integrity protection may be enabled for the PDU session.

According to some embodiments, the cellular network element is further configured to: determine that the PDU session user plane security policy is "preferred"; determine that the PDU session may flow at least in part between the wireless device and a LTE eNB; and change the PDU session user plane security policy to "not needed" based at least in part on determining that the PDU session may flow at least in part between the wireless device and a LTE eNB.

According to some embodiments, the cellular network element comprises a fifth generation core (5GC) network session management function (SMF) entity, wherein the cellular network element is further configured to: receive an indication that the wireless device may trigger mobility from the 5GC network to an evolved packet core (EPC) network; and change the PDU session user plane security policy based at least in part on the indication that the wireless device may trigger mobility from the 5GC network to an EPC network.

According to some embodiments, the cellular network element is further configured to: receive a PDU session modification request message from the wireless device, wherein the PDU session modification request comprises a mapped EPS bearer contexts information element to request one or more modifications to the QoS of one or more mapped EPS bearer contexts of the PDU session.

According to some embodiments, the cellular network element is further configured to: provide a PDU session modification reject message to the wireless device in response to the PDU session modification request message, wherein the PDU session modification reject message includes a cause code for invalid mapped EPS bearer QoS.

According to some embodiments, the cellular network element comprises a fifth generation core (5GC) network session management function (SMF) entity, wherein the cellular network element is further configured to: receive a service request from the wireless device, wherein the service request is for a service that is not supported by the 5GC network; and provide a PDU session release message to release the PDU session with the wireless device based at least in part on the service request being for a service that is not supported by the 5GC network, wherein the PDU session release message includes a cause code indicating to fallback to evolved packet service (EPS).

According to some embodiments, the PDU session release message further includes a mapped EPS bearer contexts information element indicating EPS bearer mapping information for the PDU session with the wireless device.

According to some embodiments, the cellular network element is further configured to: receive assistance information associated with the PDU session from the wireless device, wherein the assistance information indicates whether the wireless device requests user plane integrity protection or does not request user plane integrity protection for the PDU session.

Another exemplary embodiment may include a device, comprising: an antenna; a radio coupled to the antenna; and a processing element operably coupled to the radio, wherein the device is configured to implement any or all parts of the preceding examples.

Yet another exemplary embodiment may include a method, comprising: by a device: performing any or all parts of the preceding examples.

A yet further exemplary embodiment may include a non-transitory computer accessible memory medium comprising program instructions which, when executed at a device, cause the device to implement any or all parts of any of the preceding examples.

A still further exemplary embodiment may include a computer program comprising instructions for performing any or all parts of any of the preceding examples.

Yet another exemplary embodiment may include an apparatus comprising means for performing any or all of the elements of any of the preceding examples.

Still another exemplary embodiment may include an apparatus comprising a processing element configured to cause a wireless device to perform any or all of the elements of any of the preceding examples.

Another exemplary set of embodiments may include a baseband processor configured to perform operations comprising any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:
at least one antenna;
at least one radio coupled to the at least one antenna; and
a processor coupled to the at least one radio;
wherein the wireless device is configured to:
  establish a cellular link that provides access to a fifth generation core (5GC) network;
  establish a protocol data unit (PDU) session with a cellular network entity of the 5GC network;
  receive, from the cellular network entity, signaling indicating one or more quality of service (QoS) flow descriptions for the PDU session;
  determine that the PDU session may flow at least in part between the wireless device and a long term evolution (LTE) base station;
  transmit, based at least in part on the determination that the PDU session may flow at least in part between the wireless device and the LTE base station, a request to the cellular network entity of the 5GC network to modify the one or more QoS flow descriptions for the PDU session;
  receive a PDU session modification reject message in response to the request for modification, wherein the PDU session modification reject message includes a cause code for invalid mapped evolved packet service (EPS) bearer QoS, and wherein the invalid mapped EPS bear QoS is associated with an incorrect QoS;
provide a service request to the 5GC network, wherein the service request is for one or more network services or applications that are not supported by the 5GC network but are supported by an evolved packet core (EPC) network; and
receive a PDU session release message indicating to release the PDU session, wherein the PDU session release message includes a cause code indicating to fallback to evolved packet service (EPS), and wherein the PDU session release message further includes a mapped EPS bearer context information element indicating EPS bearer mapping information for the PDU session.

2. The wireless device of claim 1, wherein to request modification of the one or more QoS flow descriptions for the PDU session, the wireless device is further configured to:
provide a PDU session modification request message to the cellular network entity of the 5GC network, wherein the PDU session modification request comprises a mapped EPS bearer contexts information element and requests one or more modifications to the QoS of one or more mapped EPS bearer contexts of the PDU session.

3. The wireless device of claim 1, wherein the wireless device is further configured to:
determine that inter-RAT mobility to an evolved packet core (EPC) network is triggered,
wherein modification of the one or more QoS flow descriptions for the PDU session is requested based at least in part on determining that inter-RAT mobility to an EPC network is triggered.

4. A cellular network element, comprising:
a network port; and
a processor coupled to the network port;
wherein the cellular network element is configured to:
establish a protocol data unit (PDU) session with a wireless device;
transmit, to the wireless device, signaling indicating one or more quality of service (QoS) flow descriptions for the PDU session with the wireless device;
determine that the PDU session may flow at least in part between the wireless device and a long term evolution (LTE) base station;
receive, from the wireless device, a request for modification of the one or more QoS flow descriptions for the PDU session; and
provide a PDU session modification reject message in response to the request for modification, wherein the PDU session modification reject message includes a cause code for invalid mapped evolved packet service (EPS) bearer QoS, and wherein the invalid mapped EPS bearer QoS is associated with an incorrect QoS;
receive a service request from the wireless device, wherein the service request is for one or more network services or applications that are not supported by a fifth generation core (5GC) network but are supported by an evolved packet core (EPC) network; and
transmit, to the wireless device, a PDU session release message indicating to release the PDU session, wherein the PDU session release message includes a cause code indicating to fallback to evolved packet service (EPS), and wherein the PDU session release message further includes a mapped EPS bearer context information element indicating EPS bearer mapping information for the PDU session.

5. The cellular network element of claim 4, wherein the cellular network element is further configured to:
receive a PDU session modification request message from the wireless device, wherein the PDU session modification request comprises a mapped EPS bearer contexts information element to request one or more modifications to the QoS of one or more mapped EPS bearer contexts of the PDU session,
wherein the one or more QoS flow descriptions for the PDU session with the wireless device are modified based at least in part on the PDU session modification request message.

6. The cellular network element of claim 4, wherein the cellular network element is further configured to:
receive a PDU session modification request message from the wireless device, wherein the PDU session modification request comprises a mapped EPS bearer contexts information element to request one or more modifications to the QoS of one or more mapped EPS bearer contexts of the PDU session.

7. The cellular network element of claim 4, wherein the cellular network element comprises a 5GC network session management function (SMF) entity.

8. The cellular network element of claim 4, wherein the cellular network element is further configured to:
determine that inter-RAT mobility to an evolved packet core (EPC) network is triggered for the wireless device,
wherein the one or more QoS flow descriptions for the PDU session with the wireless device are modified based at least in part on inter-RAT mobility to an EPC network being triggered for the wireless device.

9. An apparatus, comprising:
at least one processor configured to cause a user equipment (UE) to:
establish a cellular link that provides access to a fifth generation core (5GC) network;
establish a protocol data unit (PDU) session with a cellular network entity of the 5GC network;
receive, from the cellular network entity, signaling indicating one or more quality of service (QoS) flow descriptions for the PDU session;
determine that the PDU session may flow at least in part between the UE and a long term evolution (LTE) base station; and
transmit, based at least in part on the determination that the PDU session may flow at least in part between the UE and the LTE base station, a request to the cellular network entity of the 5GC network to modify the one or more QoS flow descriptions for the PDU session; and
receive a PDU session modification reject message in response to the request for modification, wherein the PDU session modification reject message includes a cause code for invalid mapped evolved packet service (EPS) bearer QoS, and wherein the invalid mapped EPS bearer QoS is associated with an incorrect QoS;
provide a service request to the 5GC network, wherein the service request is for one or more network services or applications that are not supported by the 5GC network but are supported by an evolved packet core (EPC) network; and receive a PDU session release message indicating to release the PDU session, wherein the PDU session release message includes a cause code indicating to fallback to evolved packet service (EPS), and wherein the PDU session release message further includes a mapped EPS bearer context information element indicating EPS bearer mapping information for the PDU session.

10. The apparatus of claim 9, wherein to request modification of the one or more QoS flow descriptions for the PDU session, the at least one processor is further configured to cause the UE to:
provide a PDU session modification request message to the cellular network entity of the 5GC network, wherein the PDU session modification request comprises a mapped EPS bearer contexts information element and requests one or more modifications to the QoS of one or more mapped EPS bearer contexts of the PDU session.

11. The apparatus of claim 9, wherein the at least one processor is further configured to cause the UE to:
determine that inter-RAT mobility to an evolved packet core (EPC) network is triggered.

12. The apparatus of claim 11, wherein modification of the one or more QoS flow descriptions for the PDU session is requested based at least in part on determining that inter-RAT mobility to an EPC network is triggered.

13. The apparatus of claim 9, wherein the at least one processor is further configured to cause the UE to:
provide an indication that the UE may establish a LTE cellular link as a secondary link to provide access to the 5GC network as part of a Dual Connectivity configuration.

14. The apparatus of claim 9, further comprising:
one or more antennas.

15. The apparatus of claim 9, further comprising:
a radio operably coupled to the at least one processor.

16. The apparatus of claim 9, wherein the at least one processor is further configured to cause the UE to:
determine whether to handover the PDU session to a LTE cellular link or re-establish the PDU session via the LTE cellular link based at least in part on the one or more QoS flow descriptions for the PDU session.

17. The apparatus of claim 9, wherein the at least one processor is further configured to cause the UE to:
determine fifth generation service (5GS) to evolved packet service (EPS) QoS parameter mappings for one or more QoS flows of the PDU session; and
perform inter-RAT mobility from a fifth generation new radio (5G NR) cellular link to a LTE cellular link, wherein a bearer resource allocation request including the 5GS to EPS QoS parameter mappings for the one or more QoS Flows of the PDU session is provided by the UE when performing the inter-RAT mobility from the 5G NR cellular link to the LTE cellular link.

18. The apparatus of claim 9, wherein user plane integrity protection (UP IP) is not enabled for the PDU session.

19. The apparatus of claim 18, further comprising:
an N26 interface.

20. The apparatus of claim 9, wherein the at least one processor is further configured to cause the UE to:
determine whether user plane integrity protection (UP IP) is enabled for the PDU session.

\* \* \* \* \*